(12) United States Patent
Sauer et al.

(10) Patent No.: US 10,885,589 B2
(45) Date of Patent: Jan. 5, 2021

(54) PERSONAL PROPERTY INVENTORY CAPTIVATOR SYSTEMS AND METHODS

(71) Applicant: MASTERCARD INTERNATIONAL INCORPORATED, Purchase, NY (US)

(72) Inventors: Tara L. Sauer, O'Fallon, MO (US); Marthom Daetz, Valley Park, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 435 days.

(21) Appl. No.: 15/842,568

(22) Filed: Dec. 14, 2017

(65) Prior Publication Data
US 2019/0188796 A1 Jun. 20, 2019

(51) Int. Cl.
*G06Q 40/08* (2012.01)
*G06K 9/00* (2006.01)
*H04L 12/28* (2006.01)
*G06Q 20/34* (2012.01)
*G06Q 20/10* (2012.01)

(52) U.S. Cl.
CPC ......... *G06Q 40/08* (2013.01); *G06K 9/00671* (2013.01); *G06Q 20/102* (2013.01); *G06Q 20/34* (2013.01); *H04L 12/2812* (2013.01)

(58) Field of Classification Search
CPC ...... G06Q 40/08; G06Q 10/087; G06Q 50/16; G06Q 40/00; G06K 9/00671
See application file for complete search history.

(56) References Cited

U.S. PATENT DOCUMENTS

| | | | |
|---|---|---|---|
| 7,941,330 B1 * | 5/2011 | Buentello | G06Q 40/08 705/4 |
| 8,219,558 B1 * | 7/2012 | Trandal | G06Q 10/087 707/736 |
| 8,438,084 B1 | 5/2013 | Tesler et al. | |
| 8,615,450 B1 | 12/2013 | Fanelli | |
| 8,694,501 B1 | 4/2014 | Trandal et al. | |
| 9,092,753 B1 * | 7/2015 | Fanelli | G06Q 10/109 |
| 9,098,825 B2 | 8/2015 | Bashkin | |
| 9,280,793 B2 | 3/2016 | English et al. | |
| 9,349,113 B2 | 5/2016 | Bashkin | |
| 10,210,577 B1 * | 2/2019 | Davis | G06Q 40/08 |
| 2002/0035522 A1 | 3/2002 | Pilcher | |

(Continued)

OTHER PUBLICATIONS

"Revolutionizing Stakeholder Experience in Insurance ." TATA Consultancy Services. White Paper. <https://www.tcs.com/content/dam/tcs/pdf/Industries/insurance/insights/beyond-reality-how-augmented-and-virtual-reality-can-revolutionize-stakeholder-experience-in-insurance.pdf>2016. (Year: 2016).*

*Primary Examiner* — Elda G Milef
(74) *Attorney, Agent, or Firm* — Armstrong Teasdale LLP

(57) ABSTRACT

Personal property inventory systems and methods include a computing device that analyzes images of rooms in a residence to identify personal property items. Identified personal property items are compared to a predetermined schedule of items that is based in part on purchase transaction data for at least one resident. If an item on the schedule is not one of the identified personal property items, an inquiry to a user in the residence is made to clarify whether or not the item is in the room. Based on the analyzed images and the received answers, a personal property inventory is generated.

32 Claims, 9 Drawing Sheets

(56) References Cited

U.S. PATENT DOCUMENTS

| | | |
|---|---|---|
| 2006/0178902 A1 | 8/2006 | Vicars et al. |
| 2013/0290033 A1 | 10/2013 | Reeser et al. |
| 2015/0046299 A1 | 2/2015 | Yan |
| 2016/0191297 A1* | 6/2016 | Ram .................. H04L 41/0213 709/223 |
| 2016/0240025 A1 | 8/2016 | Bashkin |
| 2019/0278091 A1* | 9/2019 | Smits .................. H04N 13/302 |

* cited by examiner

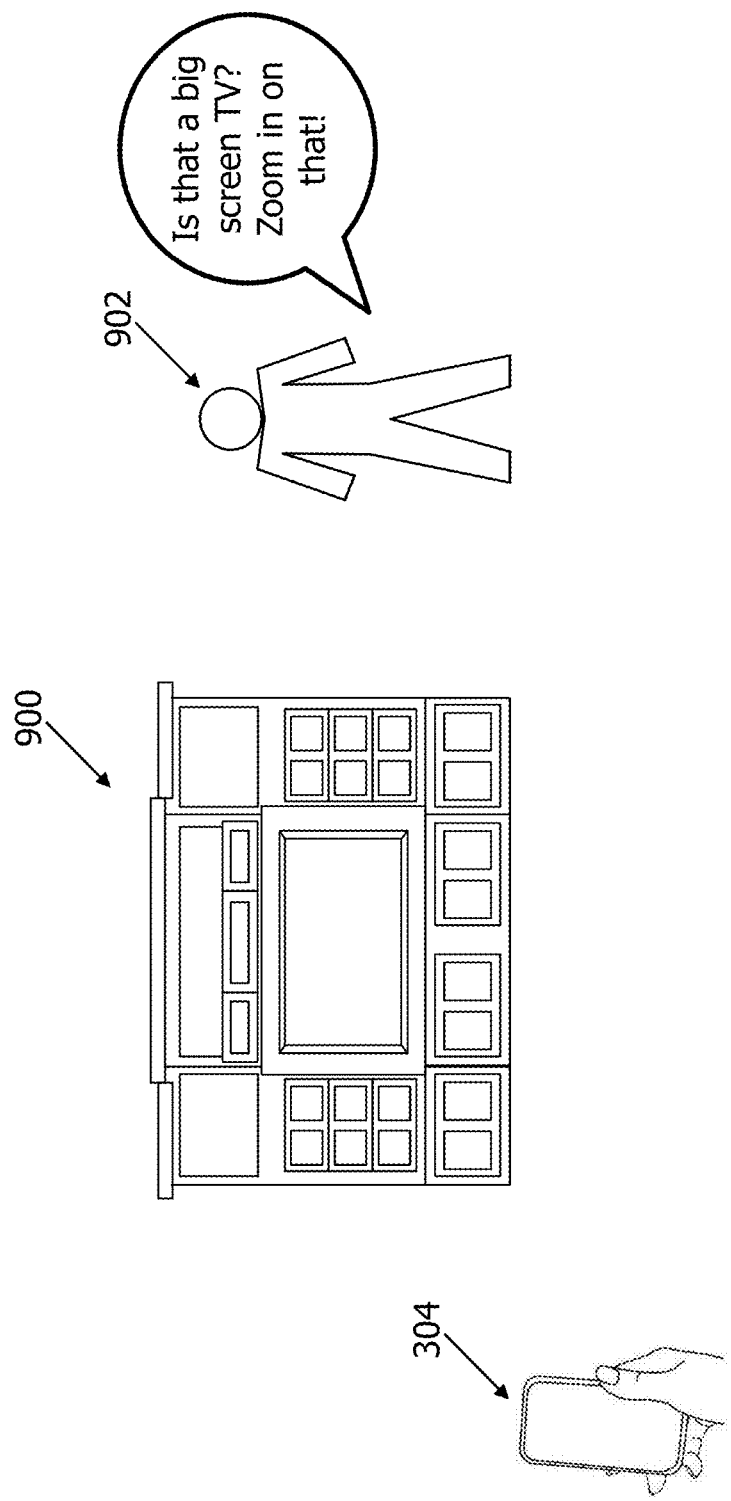

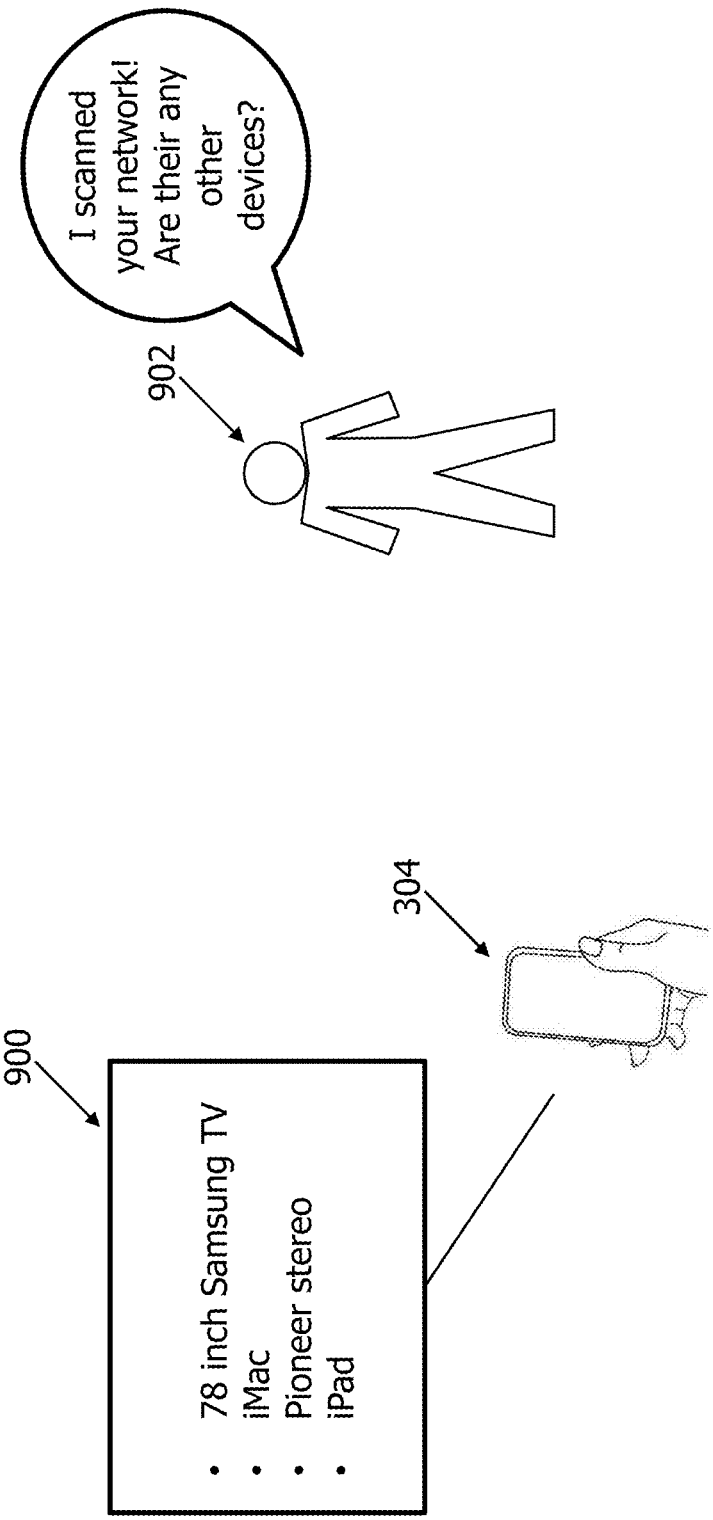

PERSONAL PROPERTY INVENTORY CAPTIVATOR SYSTEMS AND METHODS

BACKGROUND

This disclosure relates generally to electronic inventory systems and methods, and more specifically to electronic systems and methods for creating a personal property inventory for insurance purposes.

Homeowner insurance policies, as well as renter insurance policies, typically cover personal property up to a specified amount in the policy. It is advisable for homeowners and renters to make an inventory of their personal property, both to ensure that they have adequate insurance coverage and also to make a claim when needed for lost or damaged personal property in the event of casualty (e.g., fire, flood, wind) affecting a covered item. Many homeowners and renters, however, fail to make a personal property inventory as doing so can be a daunting task.

For homeowners and renters that do make a personal property inventory, updating or maintaining the list to account for changes over time can likewise be a daunting task, and safekeeping of the document in a designated place for retrieval and access when needed presents still further challenges. In the case of paper-based personal property inventories or personal property inventories stored on personal electronic devices, the papers and/or the personal electronic devices can be compromised in a casualty event. As a result, many homeowners or renters fail to possess a complete and accurate personal property inventory when an insurance claim is needed, and any attempt to create a personal property list after the fact of a casualty event is even more challenging than before. Without such a personal property inventory, homeowners and renters may not receive full compensation for lost, damaged, or destroyed personal property in a casualty event.

Additionally, certain personal property items may be separately insured if desired, and therefore specifically covered by an insurance policy in addition to or in lieu of general personal property coverage of a homeowners or renters insurance policy. Obtaining such additional or supplemental insurance is not always accomplished, however, for a variety of reasons. Some homeowners or renters may not know that specific personal property items are separately insurable. Others may intend to obtain specific insurance for certain eligible items but fail to do so. Still others may mistakenly believe that they have obtained coverage when such coverage does not exist. Considering that such items tend to be higher value items, potential consequences of failure to specifically insure them can be severe when a casualty related insurance personal property claim is needed.

Simple and effective electronic tools to simplify the time consuming tasks and practical difficulties associated with creating or maintaining a complete personal property inventory, as well as to identify personal property items for specific insurance coverage, would be desirable but at present generally do not exist.

BRIEF DESCRIPTION

In one aspect, the disclosure provides an electronic personal property inventory creation system for insurance assessment of personal property items located in a residence. The system includes at least one host computing device comprising at least one processor in communication with a memory device. The at least one host computing device is configured to receive images of personal property items in a plurality of rooms of the residence and analyze the images to identify personal property items in each of the plurality of rooms. The at least one host computing device is also configured to compare the identified personal property items in each respective one of the plurality of rooms to a predetermined schedule of items that is generated at least in part in view of purchase transaction data associated with at least one resident of the residence, and if at least one item on the predetermined schedule of items is not one of the identified personal property items in each respective one of the plurality of rooms, generate an inquiry to a user in the residence to clarify whether or not the at least one item is in the respective room. The at least one host computing device is configured to receive an answer to the generated inquiry from the user, and based on the analyzed images and the answer from the user, generate a personal property inventory for each of the plurality of rooms of the residence.

In another aspect, the disclosure provides a method for electronically generating a personal property inventory from a walk-through of a residence by a user having a computing device including a camera. The method is implemented by at least one host computing device including at least one processor in communication with a memory device. The method includes receiving images, at the at least one host computing device, of personal property items in a respective one of a plurality of rooms of the residence from the camera, and analyzing the images using computer vision components to identify personal property items in each of the plurality of rooms. The method also includes comparing the identified personal property items in each respective one of the plurality of rooms to a predetermined schedule of items that is generated at least in part based on transaction data for at least one resident of the residence, and if at least one item on the predetermined schedule of items is not one of the identified personal property items in each respective one of the plurality of rooms, generate an inquiry to a user in the residence to clarify whether or not the at least one item is in the respective room. The method further includes receiving an answer to the generated inquiry from the user, and based on the analyzed images and the answer from the user, generating a personal property inventory for each of the plurality of rooms of the residence.

In another aspect, the disclosure provides a non-transitory computer readable medium that includes computer executable instructions for electronically generating a personal property inventory from a walk-through of a residence by a user having a computing device including a camera. When executed by at least one host computing device having at least one processor in communication with a memory device, the computer executable instructions cause the at least one host computing device to receive images of personal property items in a plurality of rooms of the residence via the camera of the user device and analyze the images using computer vision components to identify personal property items in each of the plurality of rooms. The computer executable instructions cause the at least one host computing device to compare the identified personal property items in each respective one of the plurality of rooms to a predetermined schedule of items that is generated at least in part in view of purchase transaction data associated with at least one resident of the residence, and if at least one item on the predetermined schedule of items is not one of the identified personal property items in each respective one of the plurality of rooms, generate an inquiry to a user in the residence to clarify whether or not the at least one item is in the respective room. The computer executable instructions additionally cause the at least one host computing device to receive an answer to the generated inquiry from the user, and based on the analyzed images and the answer from the user, generate a personal property inventory for each of the plurality of rooms of the residence.

In another aspect, the disclosure provides an electronic personal property inventory creation system for insurance assessment of personal property items located in a residence. The system includes at least one host computing device comprising at least one processor in communication with a memory device. The at least one host computing device is configured to: receive images of personal property items in a plurality of rooms of the residence; analyze the images to identify personal property items in each of the plurality of rooms; request one of an additional image from the user or a clarifying detail from the user in order to identify at least one item in a received image; compare the identified personal property items in each respective one of the plurality of rooms to a predetermined schedule of items; and if at least one item on the predetermined schedule of items is not one of the identified personal property items in each respective one of the plurality of rooms, generate an inquiry to a user in the residence to clarify whether or not the at least one item is in the respective room; receive an answer to the generated inquiry from the user; and based on the analyzed images and the answer from the user, generate a personal property inventory for each of the plurality of rooms of the residence.

BRIEF DESCRIPTION OF THE DRAWINGS

FIG. 8 illustrates an exemplary operation of the system in a first portion of personal property inventory creation.

FIG. 9 illustrates an exemplary operation of the system in a second portion of personal property inventory creation.

DETAILED DESCRIPTION OF THE DISCLOSURE

Figure 1:
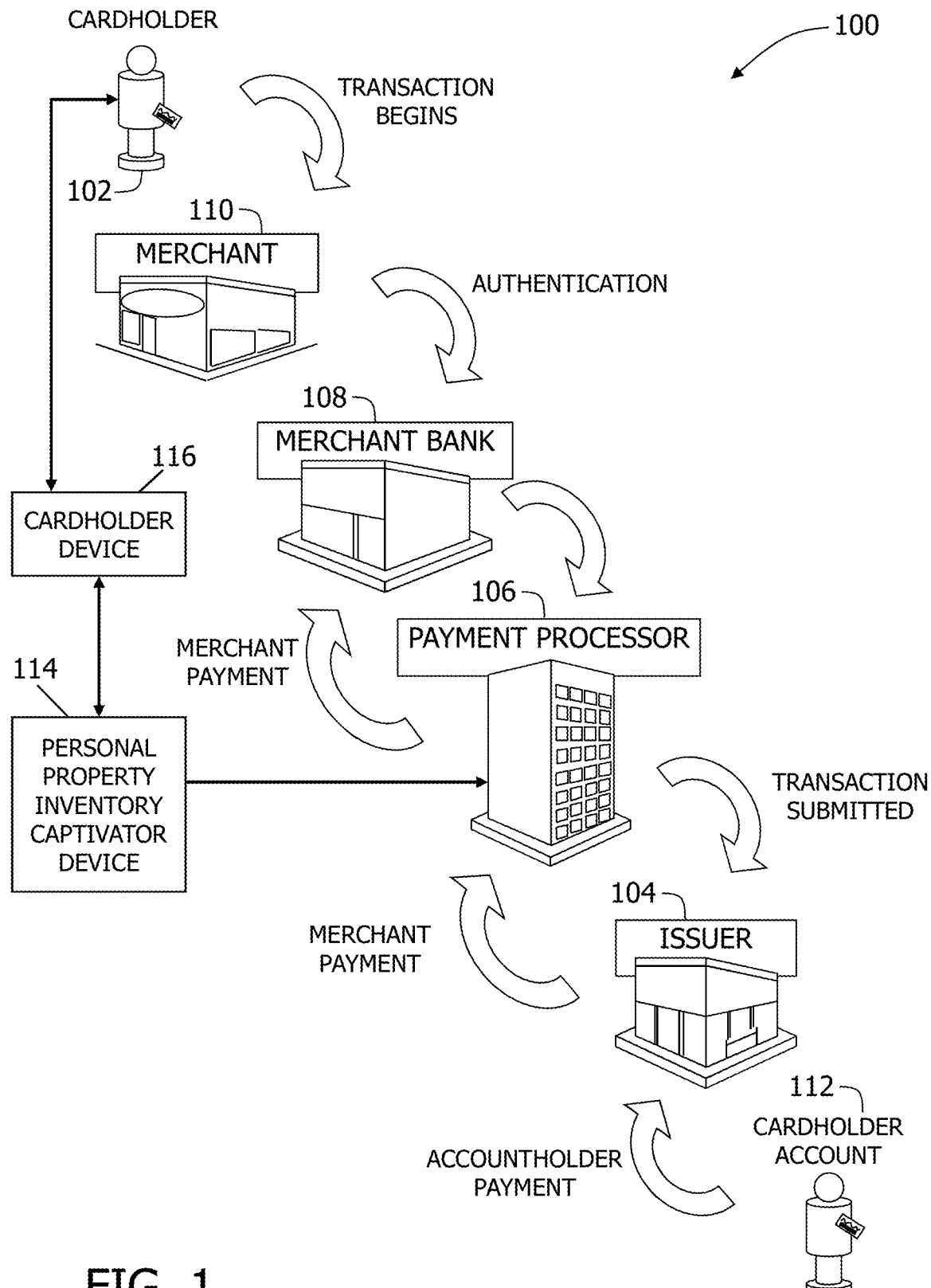
FIG. 1 is a schematic diagram illustrating an exemplary personal property inventory captivator system in communication with a multi-party payment network system for processing payment card transactions.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure.

Personal property inventory captivator systems and methods of the disclosure advantageously simplify personal property inventory creation for a homeowner or a renter of a property. The personal property inventory captivator systems and methods may be implemented on or by handheld computing devices such as a smartphones or tablet devices including cameras that a homeowner or renter may carry through the property to create a personal property inventory. The handheld computing devices communicate with a personal property inventory captivator host computing device at a remote location that receives images generated from the cameras of the handheld computing devices. The personal property inventory captivator host computing device provides a relatively simple, self-guided, convenient, and interactive user experience to the homeowner or renter via their handheld devices to create and maintain a personal property inventory. The personal property inventory captivator host computing device intelligently identifies and values personal property items while the user provides images of the rooms of the residence, and incorporates safeguards to ensure that personal property items are not inadvertently omitted from a person property inventory.

Computer vision components allow the personal property inventory captivator host computing device to automatically generate and populate an inventory list of personal property items for insurance purposes based on analysis of the images received from the handheld devices as the homeowner or renter walks through their residence room-by-room. The computer vision components include object recognition components and the like that allow the personal property inventory captivator host computing device to intelligently identify personal property objects by analyzing images received from the user's handheld computing device. The object recognition components may include dimensional components such that the personal property inventory captivator systems and methods are able to determine or deduce a relative size of identified objects in a residence and therefore provide enhanced object recognition and identification. As such, and for example, the personal property inventory captivator systems and methods may be able to identify and distinguish a standard length sofa from a non-standard length sofa, distinguish between king and queen beds, distinguish different sized televisions, etc. Dimensional aspects may accordingly be used to specifically identify items and accurately estimate their value.

The personal property inventory captivator host computing device may be in communication with computing devices of an insurance company, and the personal property inventory captivator host computing device may employ augmented reality (AR) components and techniques to produce a live direct or indirect view of a physical, real-world environment (e.g., a residence) whose elements are augmented (or supplemented) by computer-generated sensory input such as sound, video, graphics or GPS data. Augmentation is conventionally in real-time and in semantic context with environmental elements in the residence. In other words, information about the environment and its objects is overlaid on the real world. Using advanced AR technology (e.g. adding computer vision and object recognition) information about the surrounding real world of the user in a residence can become interactive. Accordingly, AR components and techniques may beneficially produce an augmented reality guide such as an insurance company spokesperson on the handheld devices to interactively guide a homeowner or renter through their living spaces in a room-by-room manner to complete the personal property inventory. The augmented reality components provide an interactive experience with a homeowner or renter in making a personal property list in a reduced amount of time while ensuring a generation of a complete and accurate personal property inventory.

Specifically, the insurance company mascot or spokesperson may be overlaid upon or superimposed in the image of the homeowner's or renter's residence to guide the user through the personal property inventory creation as if the mascot or spokesperson were in the room. For example, the insurance company mascot or spokesperson may ask the user to zoom-in on certain items that are recognized, or to obtain a better image to facilitate the object recognition. As desired, the insurance company mascot or spokesperson may ask questions of the homeowner or renter to identify an object or confirm the object recognition. Answers provided by the homeowner or renter may be communicated back to the personal property inventory captivator host and may be used to identify or value the item. The personal property inventory captivator host computing device may, by virtue of the mascot or spokesperson, employ voice queries and a natural language user interface to answer questions, make recommendations, and perform actions in response to verbal interaction with a user in a conversational manner. Alternatively, messaging features such as textboxes and menu-driven tools may be provided to allow non-verbal communication between homeowners or renters and the augmented reality mascot or spokesperson.

Based on identified objects in the room from the images received from the handheld device, the personal property inventory captivator host computing device may also intelligently identify the type of each room (e.g., kitchen, family room, dining room, master bedroom, children's bedroom, den, etc.). The personal property inventory captivator host computing device may compare the objects identified to a predetermined schedule or list of items to identify the room based on the images received, and can inquire of the user for objects that were not identified from the images. In other words, the predetermined schedule or list may provide a checklist to ensure that personal property items are not omitted from the list.

For example, a system database may include a predetermined schedule or list of items that may commonly be found (or be expected to be found) in different rooms of the residence (e.g., kitchen, family room, master bedroom, second bedroom). The predetermined schedule or list of items may be differentiated for each room, and can be used as a baseline comparator to evaluate a personal property inventory being generated by the system. For example, if the predetermined list or schedule for a master bedroom includes a television, but no television is seen in the images received and analyzed of the master bedroom in a user's residence, the augmented reality spokesperson may ask the user "Do you have television in this room?" and if so, the user can be requested or directed to provide an image of the television so that it can be added to the personal property list. As another example, if the predetermined list or schedule for the master bedroom includes jewelry items, and if the personal property inventory captivator host computing device does not recognize jewelry items from the images received, the spokesperson may ask the user "Do you have any jewelry in this room?" and if so, the user can be directed to provide an image or images of any jewelry items so that they can be added to the personal property list.

As illustrated by the examples above, the predetermined list or schedules for each room serve as a system safeguard that provide a degree of mistake proofing for a user who may inadvertently fail to provide an image including an item (e.g., a television) or who may not be thinking of an item that is concealed in a drawer or box for safekeeping (e.g., jewelry). As such, the system can gently remind or jog the memory of a user to consider items for the personal property inventory that are not evident from the images of the residence provided. Specific questions may be asked by the personal property inventory captivator host computing device that uniquely correspond to each room identified by the personal property inventory captivator host computing device as further illustrated in the examples below.

In a similar manner, the mascot or spokesperson may also ask about rooms that are not identified in a walkthrough of the residence. For example, the mascot or spokesperson may ask "Do you have a dining room?" or ask the user to identify a room that may not be recognized based on its contents, such as a playroom or storage area. A room may be noted but not inventoried at the option of a user if desired. As such, if the user inadvertently fails to provide images of the dining room, the system can gently remind the user that it still needs to be inventoried and provides another degree of mistake proofing when making a personal property inventory.

A legend of the identified room (e.g. "kitchen") may also be overlaid upon or be superimposed on the image captured by the handheld device for the benefit of the homeowner or renter. The personal property inventory captivator host computing device may ask the homeowner or renter to confirm or correct the proper identification of the room. Recognized objects may be listed room-by-room in a personal property inventory for review by the homeowner or renter. Legends of labels of identified objects (e.g., refrigerator, stove, dishwasher) may also be superimposed or overlaid on the image of the handheld device so that the user may see the system as it operates to identify objects in the room.

To ensure that personal property objects are accurately identified, the personal property inventory captivator host computing device may, via the augmented reality insurance spokesperson or mascot appearing on a handheld device of the homeowner or renter, request information or redirect the user to obtain additional images or better images for the object recognition components to analyze. For example, if the personal property inventory captivator host computing device recognizes that the images received capture only a portion of a room, the spokesperson or mascot can ask the user to provide additional images of another portion of the room. As one example of this type, the homeowner or renter may (knowingly or inadvertently) be providing images that are focused on objects sitting on the floor of the room, and if so the spokesperson can ask that the homeowner or renter provide additional images wherein the walls and ceiling can be seen as well to identify hanging objects. Again, this serves to avoid a mistaken personal property inventory that accounts for only a portion of a room.

In one aspect, the personal property inventory captivator host computing device may also, via the augmented reality spokesperson or mascot, request additional images of a specific object to facilitate its identification. As an example of this type, the spokesperson may say to a homeowner or renter "Is that a big screen television? Will you please zoom in on that?" When the user does so, the personal property inventory captivator host computing device may identify the brand name or logo of the big screen television or other identifying characteristics. The spokesperson may also ask for clarifying information such as "Is that a 60 inch screen?"

or "Will you provide the model number?" and the homeowner or renter may answer using the handheld device. The personal property inventory captivator host computing device may consult a database including images of televisions to specifically identify the type of television and its value. Also, the personal property inventory captivator host computing device may consult the Internet to locate matching images as desired that will help identify the object. The mascot or spokesperson may ask specific questions such as "Is that a curved screen?", "Is that a smart television?", or "Is that a 4k compatible television?" to help narrow down the possibilities for matches, or to confirm that the personal property inventory captivator host computing device has identified the television correctly.

In another aspect, the personal property inventory captivator systems and methods may include connecting, via the handheld device of the user, to a local Wi-Fi network or other network associated with the homeowner's or renter's residence. Once so connected to the network, the personal property inventory captivator host computing device can identify other connected electronic devices (e.g., computers, smartphones, tablets, printers, smart televisions, web-connected appliances, etc.) that the personal property inventory captivator systems and methods may look for and confirm in the residence. As such, connected devices may be self-identifying to the personal property inventory captivator systems and methods such that no questions may be required from the mascot or spokesperson to identify them or to value them.

As desired or as needed, the augmented reality spokesperson may ask about items and request details from the user in order to specifically identify and value the items. For example, the augmented reality mascot or spokesperson may ask for a zoomed-in image on the brand or logo on a kitchen appliance and ask for any clarifying information needed to identify (or confirm its identity) or value the item. For example, the mascot or spokesperson may ask "Is that a gas or electric stove?", "Is that a 34 inch cooktop?", "Does that cooktop include four or five burners?" or "What is the storage capacity of that refrigerator?" The mascot or spokesperson may also ask questions such as "Is that a black stainless steel finish on this appliance?" The answers to such clarifying queries provided by the homeowner or renter may be specifically noted on the personal property list. The personal property inventory captivator host computing device, via the augmented reality mascot or spokesperson, may ask unique questions in each room of the residence to ensure the most accurate and complete itemization of personal property.

In the event that the personal property inventory captivator host computing device may have trouble identifying an object altogether it may inquire generally or specifically of the user via the augmented reality guide. For example, the spokesperson may ask "Is that a coffee maker?", "Is that a warming drawer?" or may say "I don't recognize this object. Can you tell me what that is?". As another example, the insurance company mascot or spokesperson may say to the homeowner or renter "Is that a television on the wall? Please zoom in on that." When a homeowner follows the instruction, the insurance company mascot or spokesperson may follow up with additional questions if needed.

In one aspect, the personal property inventory captivator host computing device may communicate with a database to find information regarding an identified object, including in some cases a value of an identified object. The information may include a model number of the item, a description of the item, and a price (estimated or actual) for the item. As much of the information may be captured on the personal property list as desired, and can be helpful to a homeowner or renter both for claims purposes and to replace damaged items with comparable ones after a casualty event.

In another aspect, the personal property inventory captivator host computing device may communicate with a payment card transaction system and transaction data therefrom for an enrolled homeowner's or renter's payment card transactions. The transaction data can assist in identifying and valuing objects in the residence. Based on transaction data received from the payment card system, the personal property inventory captivator host computing device may specifically look for items purchased in payment card transactions, and if not recognized in the images received, the augmented reality spokesperson or mascot may inquire. For example, if the payment card transaction data indicates that the homeowner purchased a diamond ring, the personal property inventory captivator host computing device may, via the spokesperson, as the homeowner "I see that you purchased a diamond ring. Can I see an image of it?". Likewise, based on the payment card transaction data, the spokesperson may say "Is that the television that you purchased last year?".

Consideration of payment card transaction data may be combined with the predetermined schedule of items in each room described above for still further benefits. As such, the personal property inventory captivator host computing device may consider not only a generalized list (e.g., the predetermined list) of a hypothetical common residence of a typical or average homeowner (or renter) and the personal property items that he or she would typically possess, but also a list of specifically acquired items by each particular cardholder that consents to such use of payment card transaction data when registering or enrolling on the system. Across a number of cardholder users, the system can also be self-learning and modify the general, predetermined list of items based on purchase data to better reflect the average system user.

As another example, the payment card transaction data may show a purchase of a sofa with identifying information, and when the captivator host computing device recognizes a sofa in the residence it can verify (or ask the user via the insurance company mascot or spokesperson) whether it is the same sofa or a different one. If it is the same one, the captivator host computing device can use the purchase price as an indicator of a replacement value. When available, information from the transaction data (e.g., date of purchase, purchase price, or the merchant) may also be captured on the personal property list as desired, or be used to derive additional information (e.g., a model number of the item or a description of the item) for later use if needed after a casualty event.

Also using such payment card transaction data, the captivator host computing device can look for items that it may expect to see in the residence and inquire if not recognized in the images of the residence provided. For example, if the transaction data shows the purchase of a large screen television but such a television is not recognized anywhere in the residence the insurance company mascot or spokesperson may ask the homeowner or renter whether they still have it. The answer provided from the homeowner or renter can be noted for future use. The same can be done for major purchases such as jewelry items or kitchen appliance, and in some cases items may be automatically added to the personal property inventory at the time of purchase.

In another aspect, the personal property inventory captivator host computing device may also accept images or scans of receipts for purchased items to be added to the personal property inventory, or to establish the value of certain items in the inventory. In some cases, the personal property inventory captivator host computing device may request that the homeowner or renter provide receipts or documentation for certain items.

Based on the identified objects as the homeowner or renter walks through each room of the property and the valuation methods described above, the personal property inventory captivator host computing device automatically generates an itemized personal property inventory list for review by the homeowner or renter, including an estimated value of the personal property items in the inventory when the value of objects can be determined. The personal property inventory captivator host computing device may communicate a total estimated value of the inventory for review by the homeowner or renter to assess his or her insurance needs and to ensure that sufficient coverage has been obtained.

In another aspect, the personal property inventory captivator host computing device may notify the homeowner or renter of objects that may be separately insurable from a general personal property policy. For example, in the case above wherein the transaction data shows a purchase of a diamond ring, the spokesperson may say "Given the value of this diamond ring, it may be advisable to obtain specific insurance coverage for it. Would you like to apply?". As another example, the personal property inventory captivator host computing device may recognize a valuable piano, and the spokesperson may state "That is a beautiful piano. Have you thought about separately insuring it?". If the user responds affirmatively, a list of such separately insurable items can be automatically generated by the personal property inventory captivator host computing device and submitted to the insurance company for a quote to the homeowner or renter for specific riders or insurance products that may be available. In some cases, the personal property inventory captivator host computing device may automatically complete an application for insurance for such items. The personal property inventory captivator host computing device can do so item-by-item as insurable objects are recognized, or can do so as a batch after all such insurable items are identified in the residence.

The personal property inventory captivator host computing device may communicate with an insurance company device or otherwise receive data from an insurance company regarding insured items and may take such information into account when compiling a personal property inventory. For example, as an insured object is recognized, the insurance company mascot or spokesperson may say "Are those the diamond earrings that you have insured specifically on your policy?" or "I assume that this is the piano that you have specifically insured on your policy." If the homeowner or renter answers yes, the personal property inventory captivator host computing device can note the item on the inventory, but not suggest additional insurance.

As another example, if diamond earrings are specifically covered on an insurance policy but not identified in the images received, the spokesperson or mascot may ask "I see that you obtained separate insurance for diamond earrings. Do you still have them." If the user answers yes, the spokesperson may reply "Will you please provide an image of them for me?" Alternatively, if the user no longer has them, the spokesperson may answer "Okay. Would you like to cancel the insurance for the earrings?" and if the user answers yes the personal property inventory captivator host computing device may automatically notify the insurance company and make a request to cancel the insurance.

In another aspect, the personal property inventory captivator host computing device may allow the user to identify items and information for inclusion on the personal property list. For example, the homeowner or renter may identify a piece of antique furniture, a piece of artwork, or a collectable item or collection for specific inclusion on the personal property list that may not be easily recognized or appreciated by the personal property inventory captivator host computing device. Once identified to the personal property inventory captivator host computing device, the spokesperson can request additional information as desired. For example, the spokesperson can say "I see. Do you have any documentation for that?", "Do you have a receipt for that?" or "Please provide an estimated value for that." The personal property inventory captivator host computing device may prompt the user for separate insurability of such items depending on its value, and may automatically complete insurance application forms based on the information provided.

Once the homeowner or renter has finished walking though the rooms of the property and once all inquiries of the spokesperson or mascot are answered, the personal property inventory captivator host computing device can store the personal property list together with supporting images at a location remote from the property, which may be accessed online by the homeowner or renter on demand. If needed to make a claim after a casualty event, the personal property inventory may be safely accessed online and need not be searched for or physically located by the property owner from the site of the casualty event.

Once a personal property list has been generated, the homeowner or renter can tour the property again at a later time, with the personal property inventory captivator host computing device again receiving images from the property and identifying objects and determining whether they are accounted for on the personal property inventory, need to be added to the personal property inventory, or whether items can be removed from the personal property inventory. An updated list can be provided to the homeowner or renter whenever desired. The homeowner or renter may update the personal property list at any time desired via the personal property inventory captivator host computing device and their handheld device.

When updating a personal property inventory that was previously generated, the personal property inventory captivator host computing device may compare identified objects in received images to the previously generated list. The system can make specific inquiries regarding new items as needed, or may inquire regarding objects not identified. For example, if the previously generated list includes a piano, but no piano is seen in the images the spokesperson may say "Do you still have the piano that used to be in the great room?". The user can then confirm yes or no. If no, the piano can be removed from the list. If yes, its new location can be noted on the personal property list for future reference.

When updating a personal property inventory that was previously generated, the personal property inventory captivator host computing device may compare identified objects in received images to items that have been purchased subsequent to the time of the previously generated personal property inventory as evident from the payment card transaction data. The system can make specific inquiries regarding newly purchased items as needed, or may inquire regarding objects not identified.

In one embodiment, the disclosure provides an electronic personal property inventory creation system for insurance assessment of personal property items located in a residence. The system includes at least one host computing device comprising at least one processor in communication with a memory device. The at least one host computing device is configured to receive images of personal property items in a plurality of rooms of the residence and analyze the images to identify personal property items in each of the plurality of rooms, compare the identified personal property items in each respective one of the plurality of rooms to a predetermined schedule of items that is generated at least in part in view of purchase transaction data associated with at least one resident of the residence, and if at least one item on the predetermined schedule of items is not one of the identified personal property items in each respective one of the plurality of rooms, generate an inquiry to a user in the residence to clarify whether or not the at least one item is in the respective room. The at least one host computing device is configured to receive an answer to the generated inquiry from the user, and based on the analyzed images and the answer from the user, generate a personal property inventory for each of the plurality of rooms of the residence.

The at least one host computing device is in communication with a multi-party payment processing network for processing payment card transactions, and the at least one host computing device may further be configured to receive the purchase transaction data from the multi-party payment processing network for the at least one resident, and generate the predetermined schedule of items based upon the received purchase transaction data. The at least one host computing device may likewise be further configured to accept a user identification of at least one personal item in a received image.

The at least one host computing device may also be configured to receive transaction data from the multi-party payment processing network, identify transaction data as involving at least one enrolled cardholder, and based on the identified transaction data, automatically add a purchased personal property item to the personal property inventory.

The at least one host computing device is configured to identify at least one personal property item from an analyzed image that is specifically insurable, and notify a user in the residence of the specifically insurable item. The at least one host computing device may be configured to automatically apply for insurance coverage of the specifically insurable item. The at least one host computing device may also be configured to request a quote for insurance coverage of the specifically insurable item.

The at least one host computing device is configured to request additional or different images of at least one object in a received image, and/or may be configured to scan a network associated with the residence to identify personal property items connected to the network. The at least one host computing device may also be configured to generate an augmented reality guide to assist in the creation of the personal property inventory, wherein the augmented reality guide may be one of an insurance company spokesperson or an insurance company mascot. The at least one host computing device may be configured to conduct a natural language verbal exchange with a user in the residence.

The at least one host computing device may be configured to value items in the personal property inventory, and store the personal property at a location remote from the residence.

In another embodiment, the disclosure provides a method for electronically generating a personal property inventory from a walk-through of a residence by a user having a computing device including a camera. The method is implemented by at least one host computing device including at least one processor in communication with a memory device. The method includes receiving images, at the at least one host computing device, of personal property items in a respective one of a plurality of rooms of the residence from the camera, and analyzing the images using computer vision components to identify personal property items in each of the plurality of rooms. The method also includes comparing the identified personal property items in each respective one of the plurality of rooms to a predetermined schedule of items, and if at least one item on the predetermined schedule of items is not one of the identified personal property items in each respective one of the plurality of rooms, generate an inquiry to a user in the residence to clarify whether or not the at least one item is in the respective room. The method further includes receiving an answer to the generated inquiry from the user, and based on the analyzed images and the answer from the user, generating a personal property inventory for each of the plurality of rooms of the residence.

The at least one host computing device may be in communication with a multi-party payment processing network for processing payment card transactions, and the method may further include receiving the purchase transaction data from the multi-party payment processing network for the at least one resident, and generating the predetermined schedule of items based upon the received purchase transaction data. The method may likewise include accepting a user identification of at least one personal item in a received image.

The method may additionally include receiving transaction data from a multi-party payment processing network, identifying transaction data as involving at least one enrolled cardholder, and based on the identified transaction data, automatically adding a purchased personal property item to the personal property inventory.

The method of the disclosure may also include identifying at least one personal property item from an analyzed image that is specifically insurable, and notifying a user in the residence of the specifically insurable item. The method may likewise include automatically applying for insurance coverage of the specifically insurable item, or requesting a quote for insurance coverage of the specifically insurable item.

The method of the disclosure may also include requesting additional or different images of at least one object in a received image and/or scanning a network associated with the residence to identify personal property items connected to the network.

The method of the disclosure may include an augmented reality guide to assist in the creation of the personal property inventory in the residence. The augmented reality guide may be one of an insurance company spokesperson or an insurance company mascot. The method may also include conducting a natural language verbal exchange between the augment reality guide and a user in the residence.

The method of the disclosure may further include valuing items in the personal property inventory, and storing the personal property at a location remote from the residence.

In another embodiment, the disclosure provides a non-transitory computer readable medium that includes computer executable instructions for electronically generating a personal property inventory from a walk-through of a residence by a user having a computing device including a camera. When executed by at least one host computing device having at least one processor in communication with a memory device, the computer executable instructions cause the at least one host computing device to receive images of personal property items in a plurality of rooms of the residence via the camera of the user device and analyze the images using computer vision components to identify personal property items in each of the plurality of rooms. The computer executable instructions cause the at least one host computing device to compare the identified personal property items in each respective one of the plurality of rooms to a predetermined schedule of items, and if at least one item on the predetermined schedule of items is not one of the identified personal property items in each respective one of the plurality of rooms, generate an inquiry to a user in the residence to clarify whether or not the at least one item is in the respective room. The computer executable instructions additionally cause the at least one host computing device to receive an answer to the generated inquiry from the user, and based on the analyzed images and the answer from the user, generate a personal property inventory for each of the plurality of rooms of the residence.

The computer executable instructions may further cause the at least one host computing device to value items in the personal property inventory. The computer executable instructions may cause the at least one host computing device to identify at least one personal property item from an analyzed image that is specifically insurable and notify a user in the residence of the specifically insurable item.

In another embodiment, the disclosure provides an electronic personal property inventory creation system for insurance assessment of personal property items located in a residence. The system includes at least one host computing device comprising at least one processor in communication with a memory device. The at least one host computing device is configured to: receive images of personal property items in a plurality of rooms of the residence; analyze the images to identify personal property items in each of the plurality of rooms; request one of an additional image from the user or a clarifying detail from the user in order to identify at least one item in a received image; compare the identified personal property items in each respective one of the plurality of rooms to a predetermined schedule of items; and if at least one item on the predetermined schedule of items is not one of the identified personal property items in each respective one of the plurality of rooms, generate an inquiry to a user in the residence to clarify whether or not the at least one item is in the respective room; receive an answer to the generated inquiry from the user; and based on the analyzed images and the answer from the user, generate a personal property inventory for each of the plurality of rooms of the residence.

The technical problems addressed by the payment card processing systems and methods of the disclosure include at least one of: (i) inability to efficiently create accurate electronic records of personal property for insurance purposes; (ii) inability to automate aspects of personal property claims after a casualty event; (iii) inability to estimate a value of personal property to assess insurance coverage; (iv) inability to avoid human error in making a personal property inventory; (v) inability to avoid human error in processing insurance claims for personal property; (vi) inability to efficiently update an existing personal property inventory in an automated manner; and (vii) inability to use payment card transaction data to assist in making a personal property inventory and in estimating its value.

The personal property inventory captivator systems and methods of the disclosure may be implemented using computer programming or engineering techniques including computer software, firmware, hardware, or any combination or subset thereof, wherein the technical effects may be achieved by: (i) utilizing computer vision to automatically identify personal property objects in a residence for insurance purposes; (ii) storing electronic records at a location remote from the residence to facilitate claims for personal property after a casualty event; (iii) employing voice queries and a natural language user interface to resolve any ambiguities presented by computer vision analysis of personal property objects in an image; (iv) automating a personal property inventory compilation for avoidance of human error; (v) automating an initiation of personal property claims for avoidance of human error; (vi) providing efficient updates of a previously completed personal property inventory in view of changes over time; and (vii) integrating payment card transaction data to ensure accuracy of personal property inventories and improve estimated values of the same.

The resulting technical benefits achieved by the personal property inventory captivator systems and methods include at least one of: (i) electronic computer vision processing to identify personal property objects for insurance purposes; (ii) electronic storage of personal property records at a location remote from the residence; (iii) electronic natural language processing to interactively guide a user through the personal property inventory creation and resolve any ambiguities presented; (iv) automatic compilation of a room-by-room itemized personal property inventory; (v) automatic initiation of personal property claims after a casualty event; (vi) electronic updating of a completed personal property inventory in view of changes over time; and (vii) integration of payment card transaction data to ensure accuracy of personal property inventories and improve estimated values of the same.

In one embodiment, a computer program is provided, and the program is embodied on a computer-readable medium. In an example embodiment, the system may be executed on a single computer system, without requiring a connection to a server computer. In a further example embodiment, the system may be run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Technology, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, any type of virtual card (e.g. virtual cards generated by issuers and/or third party processors via mobile bank or desktop apps) and/or any other device that may hold payment account information, such as mobile phones, Smartphones, personal digital assistants (PDAs), key fobs, digital wallets, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

As used herein, the term "transaction data" refers to data that includes at least a portion of a cardholder's account information (e.g., cardholder name, account identifier, credit line, security code, and/or expiration data) and at least a portion of purchase information (e.g., price, a type of item and/or service, SKU number, item/service description, purchase date, and/or confirmation number) supplied by a merchant from which the cardholder is making a purchase.

FIG. 1 is a schematic diagram illustrating an exemplary personal property inventory captivator system 100 in communication with an exemplary multi-party payment card processing system and network for processing payment card transactions. The payment card processing system and network may in this example be a credit card payment network using the Mastercard® payment processor 106. Mastercard® payment processor 106 is a proprietary communications standard promulgated by Mastercard International Incorporated for the exchange of financial transaction data between financial institutions that are registered with Mastercard International Incorporated. (Mastercard is a registered trademark of Mastercard International Incorporated located in Purchase, N.Y.). Embodiments described herein may also relate to digital payment services such as MASTERPASS® by Mastercard or another digital wallet service for a mobile device such as a smartphone.

In the payment card processing network shown, a financial institution, such as an issuing bank 104, issues a payment card, such as a credit card account or a debit card account, to a cardholder 102, who uses the payment card to tender payment for a purchase from a merchant 110. To accept payment with the payment card, merchant 110 must normally establish an account with a financial institution that is part of the financial payment system. This financial institution is usually called the "merchant bank" or the "acquiring bank" or simply "acquirer". When a cardholder 102 tenders payment for a purchase with a payment card (also known as a financial transaction card), merchant 110 requests authorization from merchant bank 108 for the amount of the purchase. The request may be performed over the telephone or via a website, but is oftentimes performed through the use of a point-of-sale terminal, which reads the cardholder's account information from the magnetic stripe on the payment card and communicates electronically with the transaction processing computers of merchant bank 108. Alternatively, merchant bank 108 may authorize a third party to perform transaction processing on its behalf. In this case, the point-of-sale terminal will be configured to communicate with the third party. Such a third party is usually called a "merchant processor" or an "acquiring processor."

Using payment processor 106, the computers of merchant bank 108 or the merchant processor will communicate with the computers of issuing bank 104 to determine whether the cardholder's account is in good standing and whether the purchase is covered by the cardholder's available credit line or account balance. Based on these determinations, the request for authorization will be declined or accepted. If the request is accepted, the transaction is given a bank network reference number, such as the Banknet Reference Number used by Mastercard International Incorporated, an authorization code, and/or other transaction identifiers that may be used to identify the transaction.

The payment network may be configured to process authorization messages, such as ISO 8583 compliant messages and ISO 20022 compliant messages. As used herein, "ISO" refers to a series of standards approved by the International Organization for Standardization (ISO is a registered trademark of the International Organization for Standardization of Geneva, Switzerland). ISO 8583 compliant messages are defined by the ISO 8583 standard which governs financial transaction card originated messages and further defines acceptable message types, data elements, and code values associated with such financial transaction card originated messages. ISO 8583 compliant messages include a plurality of specified locations for data elements. ISO 20022 compliant messages are defined by the ISO 20022 standard. For example, ISO 20022 compliant messages may include acceptor to issuer card messages (ATICA).

During the authorization process of the payment card processing system, the clearing process is also taking place. During the clearing process, merchant bank 108 provides issuing bank 104 with information relating to the sale. No money is exchanged during clearing. Clearing (also referred to as "first presentment") involves the exchange of data required to identify the cardholder's account 112 such as the account number, expiration date, billing address, amount of the sale, and/or other transaction identifiers that may be used to identify the transaction. Along with this data, banks in the United States also include a bank network reference number, such as the Banknet Reference Number used by Mastercard International Incorporated, which identifies that specific transaction. When the issuing bank 104 receives this data, it posts the amount of sale as a draw against the available credit in the cardholder account 112 and prepares to send payment to the merchant bank 108.

When a request for authorization is accepted, the available credit line or available account balance of cardholder's account 112 is decreased. Normally, a charge is not posted immediately to a cardholder's account 112 because bankcard associations, such as Mastercard International Incorporated, have promulgated rules that do not allow a merchant to charge, or "capture," a transaction until goods are shipped or services are delivered. When a merchant 110 ships or delivers the goods or services, merchant 110 captures the transaction by, for example, appropriate data entry procedures on the point-of-sale terminal. If a cardholder 102 cancels a transaction before it is captured, a "void" is generated. If a cardholder 102 returns goods after the transaction has been captured, a "credit" is generated.

After a transaction is captured, the transaction is settled between merchant 110, merchant bank 108, and issuing bank 104. Settlement refers to the transfer of financial data or funds between the merchant's account, merchant bank 108, and issuing bank 104 related to the transaction. Usually, transactions are captured and accumulated into a "batch," which is settled as a group.

Much transaction data is captured by multi-party payment card processing systems that is presently under-utilized to address issues presented by attempts to create a personal property inventory for homeowner's or renter's insurance policies as described next. Accordingly, the system 100 includes a personal property inventory captivator computing device 114 that receives and processes payment card transaction data from the payment card processing system and network in order to automate a personal property inventory creation by the cardholder 102 via a cardholder computing device 116 including a camera so that the cardholder may provide images of a residence to the personal property inventory captivator computing device 114. The personal property inventory captivator computing device 114, in turn, processes the images of the residence provided by the cardholder and may compare recognized personal property items to the payment card transaction data in order to complete and compile an accurate personal property inventory list for the cardholder 102. Payment card transaction data may be considered as desired for multiple cardholders in the same reference when the personal property in a residence belongs to different persons (e.g., a married couple and a teenager) inhabiting the residence.

Figure 2:
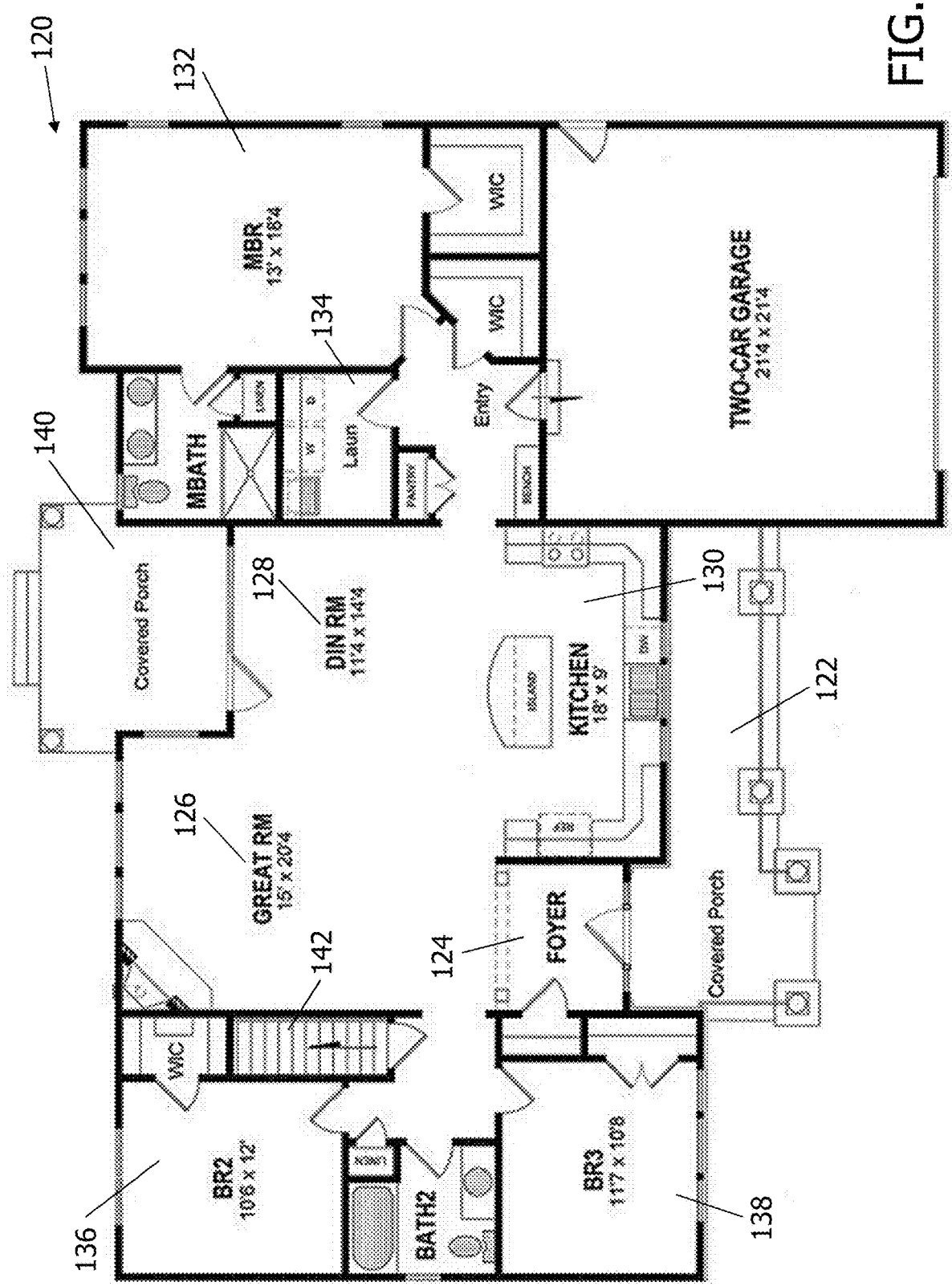
FIG. 2 is an exemplary floor plan of a residence including personal property items upon which the system and method of the disclosure may compile an itemized personal property inventory.

FIG. 2 is an exemplary floor plan of a residence 120 including personal property items upon which the system and method of the disclosure may compile an itemized personal property inventory in an automated manner. The residence 120 in the example shown includes a front porch 122, a foyer 124, a great room 126, a dining room 128, a kitchen 130, a master bedroom 132, a laundry room, bedrooms 136, 138 and a rear covered porch 140. Additional rooms such as bathrooms, closets and hallways are shown, as well as a garage. Stairs 142 are shown that lead to a second level (up or down) of the residence that include additional rooms. Any of the rooms in the residence 120 shown may include personal property items to be inventoried to ensure adequate insurance coverage or to make an accurate claim that can be processed in the event that the residence and associated personal property becomes subject to a covered casualty (e.g., fire, flood, wind, earthquake, etc.). Many different floor plans of a residence are possible, and the systems and methods of the disclosure may reliably work to create a personal property inventory regardless of the floor plan. While residential house is shown in the example of FIG. 2, the residence may likewise be a townhome, an apartment, a condominium or any other type of residence desired that qualifies for insurance purposes.

Considering that each of the a front porch 122, foyer 124, great room 126, dining room 128, kitchen 130, master bedroom 132, laundry room, bedrooms 136, 138 and the rear covered porch 140 in a fully furnished home include numerous items of personal property, and that the bathrooms, closets and hallways and any additional level and rooms would likewise include personal property to be inventoried, one can quickly see how and why the creation of a personal property list is challenging to a typical homeowner or renter. In any given room, listing each piece of furniture, each electronic device, each lighting device, accessories, appliances, with an appropriate amount of detail to facilitate their identification and replacement is logistically challenging, and multiplied over the rooms of the residence 120 the challenges only grow.

Manual creation of a handwritten list of personal property items in each room (or storage area) of the residence 120 is not only time and labor intensive, but is subject to human error in incorrectly listing items, omitting items, or making illegible entries. Creating a personal property list on a computer is preferred in some ways but creates additional opportunities for mistake and error in the list, especially so when the computer list is prepared from a handwritten list. Assuming that a homeowner or renter actually completes the task of creating a personal property inventory, in the case of a paper list it can easily be lost, misplaced, or damaged in a casualty event such that the inventory cannot be easily located (or located at all) for purposes of making an insurance claim or replacing items. Computer lists created on computer devices in the residence can likewise be compromised by damage in a casualty event, inadvertently lost, or difficult to produce when needed to make an insurance claim. Both paper lists and computer lists also tend to become outdated rather quickly and their use may accordingly be limited when needed.

Because of the difficulties in making or maintaining a personal property inventory, it is difficult for a homeowner or renter to meaningfully assess insurance coverage as sufficient (or not) to cover the desired personal property items. In some cases, a homeowner or renter may not realize that certain items may be separately insured or may be confused regarding the coverage that actually exists for certain items. As a result, the personal property coverage may not be sufficient to cover the homeowner's or renter's actual losses when calamity strikes. Aside from generating a personal property inventory, estimating the value of inventoried personal property across the residence 120 presents further time intensive and labor intensive tasks and difficulty that most homeowners and renters would prefer to avoid.

Figure 3:
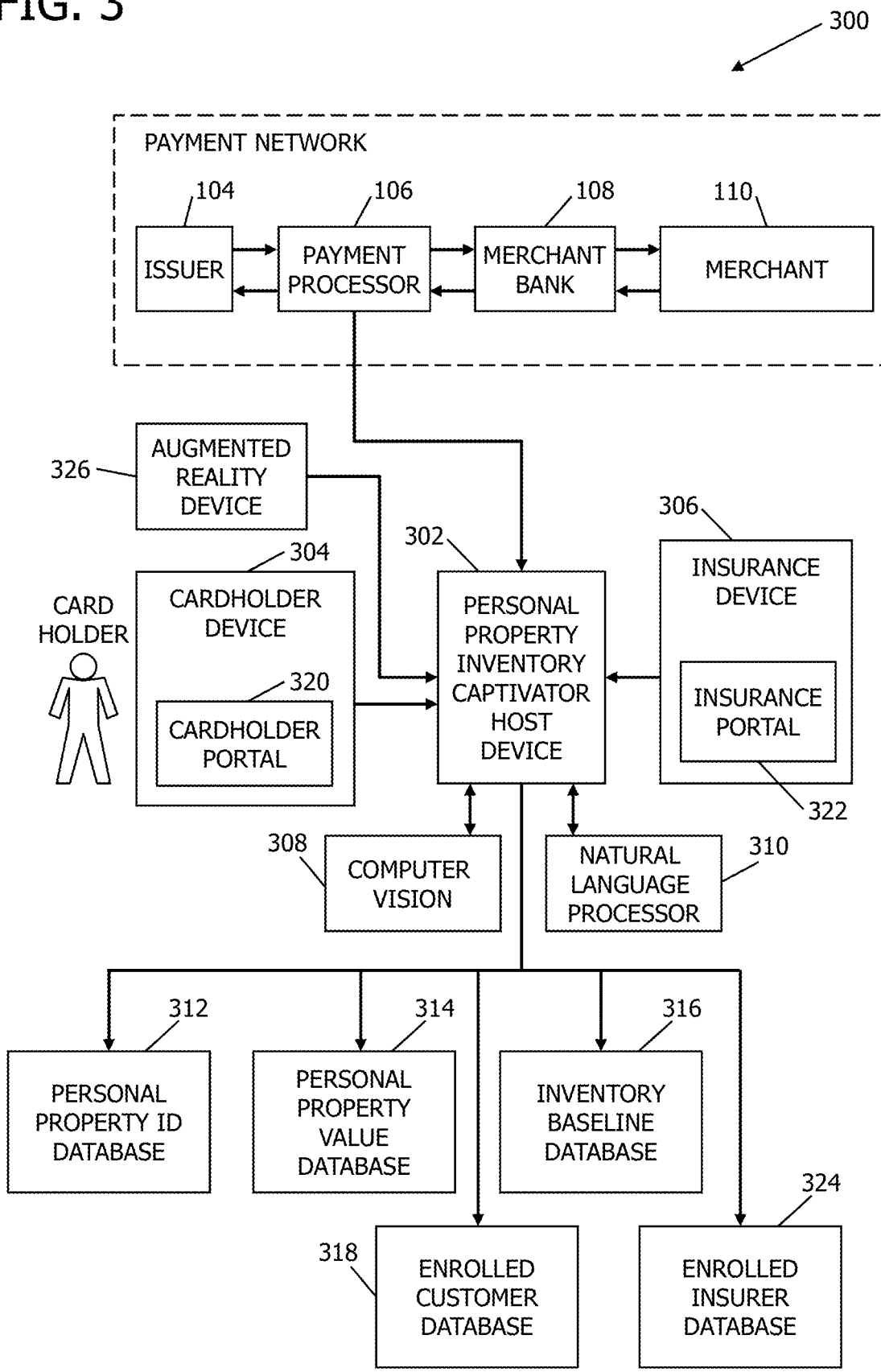
FIG. 3 is an expanded schematic diagram illustrating an exemplary computer system of the disclosure including a personal property inventory captivator host computing device that facilitates the compilation of a personal property inventory for the residence shown in FIG. 2.

FIG. 3 is a schematic diagram illustrating an exemplary system 300 that facilitates an automated compilation of a personal property inventory for a residence such as that shown in FIG. 2.

The system 300 includes a personal property inventory captivator computing device 302 in communication with the payment network (FIG. 1) including the issuer 104, payment processor 106, merchant bank 108 and merchant 110. The system 300 accordingly may benefit from transaction data received from the payment network as described below to assist with the creation of a personal property inventory. In particular, for homeowners or renters who are also cardholders, the transaction data from the payment network can enhance the personal property inventory process conducted with the system 300. It is recognized, however, that the benefits of the system 300 do not necessarily depend on the homeowner or renter being a cardholder and as such any communication with the payment network and receipt of transaction data therefrom in some embodiments may be considered optional and need not be provided. For the remainder of the disclosure, however, it is assumed that the homeowner or renter is a cardholder to fully illustrate corresponding features of the system 300.

The personal property inventory captivator computing device 302 is further shown in FIG. 3 in communication with a cardholder device 304 at a first location remote from the personal property inventory captivator computing device 302, an insurance provider device 306 at a second location remote from the personal property inventory captivator computing device 302, a computer vision device 308, a natural language processing device 310 and various databases including a personal property identification database 312, a personal property value database 314, an inventory baseline database 316, and an enrolled customer database 318. The computer vision device 308, a natural language processing device 310 and databases 312, 314, 316, and 318 may be local to the personal property inventory captivator computing device 302 or at respectively different locations from the personal property inventory captivator computing device 302 in various different embodiments.

A cardholder may use the cardholder device 304 and cardholder portal 320 to interact with the personal property inventory captivator computing device 302, and an insurance provider may use the insurance device 306 and an insurance portal 322 to interact with the personal property inventory captivator computing device 302. The personal property inventory captivator computing device 302 may in turn communicate with each of the cardholder device 304 and the insurance device 306 in the manner described below.

A cardholder using the cardholder computing device 304 may enroll as a participating cardholder in the personal property inventory captivator computing device 302. Considering that more than one cardholder may live in the same residence, multiple cardholders may be enrolled and considered in combination by the system in creating a personal property inventory. Enrollment may include acceptance of personal property inventory service terms, preferred contact information (e.g., email, SMS text notification, push notification, notification via a digital wallet service, etc.) and preferences for personal property inventory service notifications and the like, or other desired information relating to the cardholder to provide the personal property inventory services described.

In contemplated embodiments, the enrollment of cardholders includes opt-in informed consent of users to data usage by the system consistent with consumer protection laws and privacy regulations. In some embodiments, the enrollment data and/or other collected data may be anonymized and/or aggregated prior to receipt such that no personally identifiable information (PII) is received. In other embodiments, the system may be configured to receive enrollment data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals, or may make use of such personal information, the individuals may be provided with an opportunity to control whether such information is collected or to control whether and/or how such information is used. In addition, certain data may be processed in one or more ways before it is stored or used, so that personally identifiable information is removed.

The cardholder enrollment may include payment card information and insurance information. Insurance information may include the address of the residence where insured personal property items are located, the cardholder status as homeowner or renter, insurance provider information, policy number information and policy details, insurance agent information, insurance contact information, and insurance premium information.

The cardholder enrollment may also include cardholder acceptance and preferences regarding personal property inventory services. For example, a cardholder may select or allow property purchased with their payment card to be automatically added to a personal property inventory at the completion of a purchase transaction. In this aspect, the cardholder may select or allow only items of at least a predetermined purchase value to be added to a personal property inventory, or may select or allow an automated application for specific insurance coverage of a purchased item based on its value or by category. For example, a cardholder may as part of the system enrollment elect that all purchased jewelry items be added to a personal property list, and that any jewelry item exceeding $1,500 be specifically insured. As another example, a cardholder may elect as part of the system enrollment that only clothing items exceeding a specified value be added to the personal property list, and as such some clothing item purchases may be added to the personal property inventory upon purchase and some might not. As still another example, a cardholder might opt to add any purchase of an item exceeding a certain value to be added to the list, regardless of the type or category of the item purchased. Depending on the cardholder selections made, the personal property list can be updated item-by-item as they are purchased.

Cardholders may likewise select or allow for payment of insurance costs via their payment card when enrolling on the system. Notification preferences and reminders may also be scheduled for review of the personal property inventory in a selected timeframe (e.g., once a year). The services provided by the personal property inventory captivator computing device 302 is contemplated as an opt-in service such that only specifically enrolled cardholders may experience such services. Permission to utilize location services in the cardholder device 304 may be obtained as part of the enrollment process. Such opt-in consent may be made in any manner desired and accepted by the personal property inventory captivator computing device 302.

In some embodiments, the opt-in consent may be made through a digital wallet service or application residing on the cardholder device 304, and a digital wallet service may provide the cardholder portal 320 shown in FIG. 3. More than one cardholder portal 320 is possible, however, using different devices of the cardholder. The cardholder portal 320 may be the same portal provided for other purposes to allow the cardholder to check payment card transaction activity, review account balances, review payment history, dispute charges, etc. or alternatively may be a unique portal specific to the personal property inventory captivator computing device 302.

Once a cardholder is enrolled, cardholder information is stored in the enrolled customer database 318. As payment card transactions are made and processed by the payment network 100, the personal property inventory captivator computing device 302 can retrieve information from the enrolled customer database 318 in order to identify a payment card transaction made by an enrolled cardholder to provide the personal property inventory captivator computing device. For example, the personal property inventory captivator computing device 302 may compare a primary account number (PAN) of a payment card transaction from, for example, the payment processor 106 in the payment network 100 as a payment card transaction is completed to see if it corresponds to the PAN of an enrolled cardholder in order to make such a determination. Preferences and cardholder profile information may also be retrieved for purposes of notice generation (or lack thereof) by the personal property inventory captivator computing device 302. Notices or alerts to cardholder users generated by the system may be active (e.g., a push notification that activates the user device for possible response) or passive (e.g., email) in nature.

An insurance provider using the insurance computing device 306 may also enroll as a participating insurer in the personal property inventory captivator computing device 302. Enrollment of insurers accepts insurance information and preferences of insurers for interaction with the personal property inventory captivator computing device via an insurance portal 322. Once an insurer is enrolled, insurer information is stored in an enroller insurer database 324 for use by the personal property inventory captivator computing device 302 to provide personal property inventory services. Such services may include for example, access to insurance application forms that the personal property inventory captivator computing device 302 may complete and return, access to request for quote forms that the personal property inventory captivator computing device 302 may complete and return, automatic transmission of a personal property list to the insurance provider in a desired format, automatic access and retrieval to insurance policy information and data, and automatic payment processing of premiums on the cardholder's behalf.

The personal property inventory captivator computing device 302 is shown to be in communication with a computer vision device 308, a natural language processing device 310, and an augmented reality device 326 to provide services for the cardholders to complete the personal property inventory as described below. While shown as separate devices, the computer vision components, the natural language processing components and the augmented reality components may be part of the personal property inventory captivator computing device 302 in some embodiments. When the cardholder device 304 is connected to the personal property inventory captivator computing device 302, images from the cardholder device camera are supplied to the personal property inventory captivator computing device 302. As such, the cardholder can provide images from the rooms of the residence 120 (FIG. 2) to the personal property inventory captivator computing device 302 for analysis.

The computer vision device 308 operates on the received images from the cardholder device 304 to identify personal property objects in the images received. The natural language processing device 310 facilitates verbal interaction with the cardholder regarding the images received and the operation of the computer vision device 308.

In contemplated embodiments, the system 300 advantageously utilizes augmented reality techniques to optimize the creation of a personal property inventory while reducing or eliminating human error or oversight on the part of the cardholder. As used herein, the term "augmented reality" (AR) generally refers to a view of a physical, real-world environment of a viewer where certain elements in the view (or AR view) are augmented by computer-generated sensory input, such as sound, video, or graphics data. The computer-generated (CG) elements may be purely computer-generated or generated using a real-world object that is in the viewer's physical environment or is remotely located from the viewer. The CG elements are superimposed onto the viewer's physical environment to create an augmented reality as distinct from the viewer's physical reality. While cardholder devices such as smartphones and tablet devices are contemplated to provide the AR views, in further implementations, the viewer may use a dedicated AR display device to see the AR view. Such dedicated AR display devices may include glasses, goggles, a heads-up display, or the like. Additionally, a viewer will often have one or more optical instruments, such as cameras, for recording or capturing images of the viewer's environment.

Specifically, and for the purposes or personal property inventory creation, the augmented reality device 326 produces an image of an insurance company spokesperson or mascot that is overlaid on the image of the cardholder device 304 that the cardholder may see. Consequently, from the cardholder's perspective it is as if the insurance company spokesperson or mascot was present in the room with the cardholder as the images are being taken and as the personal property inventory is being created for personal property items in the residence. In other words, the augmented reality device 326 provides an image back to the cardholder device that is augments the image from the cardholder device camera to provide an immersive and interactive guided user experience to complete a personal property inventory creation as the cardholder walks through the rooms of the residence with the device 304.

For example, an image of "The Progressive Girl", also known as Flo, may be generated by the augmented reality device 326 and appear on the cardholder device display as a representative of the Progressive Corporation, a well-known insurance company that has featured Flo as a spokesperson in hundreds of television commercials. For an existing or prospective Progressive insurance customer, Flo may interact with the cardholder based on the images received by the system to help create a complete and accurate personal property inventory. Via the natural language processing device 310, a cardholder may engage in conversation with Flo as the personal property inventory is being created, either by making queries or answering questions from Flo. Various different persons affiliated with different insurance companies may likewise be incorporated via the augmented reality device 326, and verbal interaction may be made via the natural language processing device 310. Alternatively, text boxes or menu driven tools may be provided separately from or in combination with natural language processing for a cardholder to interact with the spokesperson, or vice-versa.

As another example, the gecko lizard mascot of GEICO may appear and interact with the cardholder based on the images received. Via the natural language processing device 310, a cardholder who is an existing or prospective GEICO customer may engage in conversation with the gecko lizard mascot as the personal property inventory is being created. Various different mascots affiliated with different insurance companies may likewise be incorporated via the augmented reality device 326, and verbal interaction may be made via the natural language processing device 310. Alternatively, text boxes or menu driven tools may be provided separately from or in combination with natural language processing for a cardholder to interact with the mascot, or vice-versa.

From the above, different cardholders using different insurance companies will see different spokespersons or mascots when using the system 300. The spokesperson or mascot may direct the user to provide images from different vantage points or redirect the camera of the cardholder device 304, to zoom-in on certain objects, or to answer questions to help the system identify or value objects as described below. While insurance company spokespersons or mascots are described to provide an augmented reality guide through the personal property process, the guide need not be an insurance company spokesperson or mascot in other embodiments. As long as an augmented reality guide having some personality is provided by the augmented reality device, the user may interact with the guide with similar effect. In some embodiments, a single augmented reality guide could be provided for all enrolled cardholders regardless of which insurance company they choose. Nonetheless, the following description assumes that the augmented reality guide is an insurance company spokesperson or mascot.

The personal property identification database 312 may include images of personal property items that can be matched with items that can be recognized in the received images being analyzed by the system, and when necessary or desirable the augmented reality guide can assist in requesting better or additional images and in clarifying objects that the system is attempting to identify. For example, the spokesperson or mascot may say to the cardholder "Is that a big screen television? Can you zoom in on that?". When a user does so, the computer vision 308 may identify the television as a Samsung brand television from the name or logo that is visible on the zoomed-in image. When dimensional capability is included in the computer vision device 308 the spokesperson or mascot may ask the user to confirm the screen size by saying "That looks like a 60 inch screen. Is that correct?" Otherwise, the spokesperson or mascot may say "Can you tell me the size of the screen on the television?". The spokesperson or mascot may likewise ask the cardholder for other details (e.g., "Is that a 4k compatible screen?") or to confirm other details (e.g., "Is that an LED screen or a plasma screen?") so that the television can be specifically be identified. The personal property identification database 312 includes model numbers and descriptive data that can be used to make queries to the cardholder or to note on the personal property list once a match is identified. The personal property inventory captivator computing device 302 can then consult the personal property value database 314 to determine a value of the identified television.

In contemplated embodiments, the personal property identification database 312 and/or the personal property value database 314 may include payment card transaction data for the enrolled cardholder as mentioned above. In such a case, the system once it sees a Samsung television may check the transaction data for the purchase of a Samsung television, and if such transaction data exists ask the cardholder to confirm. The system may use the purchase price from the transaction data as the value for the television.

The personal property inventory captivator computing device 302 may also communicate with a personal property inventory baseline database 316 in order to create a complete and accurate personal property inventory. The personal property inventory baseline database 316 may include predetermined lists or schedules of personal property items that may be typically found (or expected to be found) in certain rooms of a residence. The predetermined lists or schedules may be based on a hypothetical average or typical resident and may include items that they would commonly have or be expected to have in their residence. For example, a first baseline list of personal property items for a master bedroom may include jewelry items, while a second baseline list of personal property items for a kitchen may not. As such, if jewelry items are not seen in the images of the master bedroom, the spokesperson or mascot may inquire if jewelry items exist, and if so request that the cardholder provides images of the jewelry items.

As another example, the baseline list of personal property items for a master bedroom may include a television while a list of personal property items for a dining room may not. As such, if a television is not seen in the images of the master bedroom, the spokesperson or mascot may inquire if there is a television in the room, and if so request that the cardholder provides images of the television.

In one aspect, the predetermined lists or schedules can be particularized for residents in different geographic areas. For example, the predetermined lists or schedules of rooms for a residence in the Northeastern United States may be different in some ways for the predetermined lists or schedules of rooms for a residence in the Southwestern United States. As the system processes records for numerous users in each of such regions, the system may also adaptively begin to customize the predetermined lists or schedules of rooms in each region so that they are more accurate. That is, the system may be self-learning to intelligently update the predetermined lists or schedules of rooms over time as more data is gathered. In view of this, personal property inventories created at different times may be made in reference to different predetermined lists or schedules of rooms. Similar optimizations can be made in view of payment card transaction data collected and analyzed by the system, either regionally with respect to users in different geographic areas or generally across all users. In this manner, the system will become progressively better over time to optimally capture a current personal property inventory of a residence with intelligently modified checklists to compare to images of residences as the system operates.

As the cardholder proceeds through the residence room-by-room and provides images to the personal property inventory captivator computing device 302, the personal property inventory captivator computing device 302 may utilize the inventory baseline database to identify the room, and may display a legend of the room on the cardholder device via operation of the augmented reality device 326, or ask for confirmation via the spokesperson or mascot (e.g., Is this the master bedroom?"). As objects are identified, they may likewise be labeled on the display of the cardholder device 304 via operation of the augmented reality device 326. As each device is identified (and confirmed by the cardholder if needed) the item is added to the personal property list, which may be itemized room-by-room. When the cardholder has presented images of all the rooms, the system will have automatically generated a complete personal property inventory that can be stored in the enrolled customer database 318 for easy retrieval and review via the cardholder device 304.

The transaction data for an enrolled cardholder may also be stored and added to the personal property baseline for the corresponding cardholder. As such, if the transaction data shows that an enrolled cardholder has purchased diamond earrings, the system can look for them in the received images and if not identified the system may inquire if the cardholder still has them, and if so request that images be provided. As another example, if the transaction data shows that an enrolled cardholder has purchased a large screen television, the system can look for the television in the received images and if not identified the system may inquire.

The personal property inventory captivator computing device 302 further allows the cardholder to identify items that the personal property inventory captivator computing device 302 might not be able to identify or value. For example, a cardholder may identify an object in the image as a rare piece of art, an antique piece of furniture, a collectible or collection that the cardholder deems valuable enough to be specifically noted in the personal property inventory. The cardholder may also provide a receipt of documentation of value for such items to the system, which may be stored in the system for future reference and use. On this note, the system may request or receive receipts or documentation for other items as confirmation of value and may store such receipts for future reference. As such, the system can receive positive indication of value for items that are not purchased with a payment card.

The personal property inventory captivator computing device 302 also serves as an educational tool to advise cardholders of items that may be separately insurable from other personal property when identified. For example, jewelry items exceeding a certain value, musical instruments exceeding a certain value, or another item may be the subject of an insurance rider for coverage apart from a general personal property provision. The spokesperson or mascot may accordingly notify the cardholder that specific insurance coverage may be available for certain items, and the personal property inventory captivator computing device 302 may consult the databases 314 and 324 to identify such items and potential coverage. If the cardholder desires, the personal property inventory captivator computing device 302 can automatically fill out necessary forms and submit an application form to the insurance provider via the device 306, or complete a request for insurance quote from the insurance provider via the insurance device 306. As another option, the system may generate a list of items that are specifically insurable and provide it to the cardholder for personal follow up with the insurance company.

When permission is given by the cardholder, which may be obtained as a part of an enrollment step, the personal property inventory captivator computing device 302 may also receive information, via the cardholder device 304, concerning a network established in the residence and other devices that are connected to that network. The system may add the other connected devices to the personal property list, look for the devices in the images received from the cardholder device, and if necessary ask the cardholder to confirm their presence in the home and make a request for images of the devices. In this manner, connected devices may be self-identifying and expedite the personal property inventory creation for those items as much less ambiguity (or no ambiguity) may be presented concerning specific identification of such devices.

The identification techniques described (image processing, image matching, transaction data, device connection data) and the ability of the system to ask or confirm details via the augmented reality guide affords a rather efficient system that can quickly recognize objects and confirm them in redundant fashion to meet the needs of particular cardholders, and greatly reduce the time needed to provide a complete personal property inventory and value of the items in the inventory.

Once completed, the personal property inventory is safely stored in the system at a remote location from the cardholder's residence. Image data may be stored as well as proof of items listed in the inventory. A copy may be sent to the cardholder in any manner desired for review or safekeeping by the cardholder, or the cardholder may access the inventory online whenever desired. A copy of the personal property may be sent to the insurance company via the device 306 via the system 300 at the time of creation or at the time an insurance claim is made.

An estimated value of the personal property inventory is also generated by the system 300 and made available to the cardholder so that the cardholder can assess his or her personal property coverage limits as compared to the existing or proposed insurance policy limits. Itemization of separately insured items can also be generated, including cost or premium information for the cardholder's review.

Each of the personal property inventory and value estimates can be updated automatically as personal property objects are acquired with a payment card, depending on the cardholder enrollment preferences described above. The system 300 also generates notifications or alerts at a timeframe selected by a cardholder (e.g., once a year) to update the personal property inventory. At such time, the cardholder can again provide images of the rooms of the residence via the device 304. In addition to the identification techniques described above, the personal property inventory captivator computing device 302 can consult the previously generated personal property inventory and associated images and identify changes to complete an updated personal property inventory in a reduced amount of time.

Figure 4:
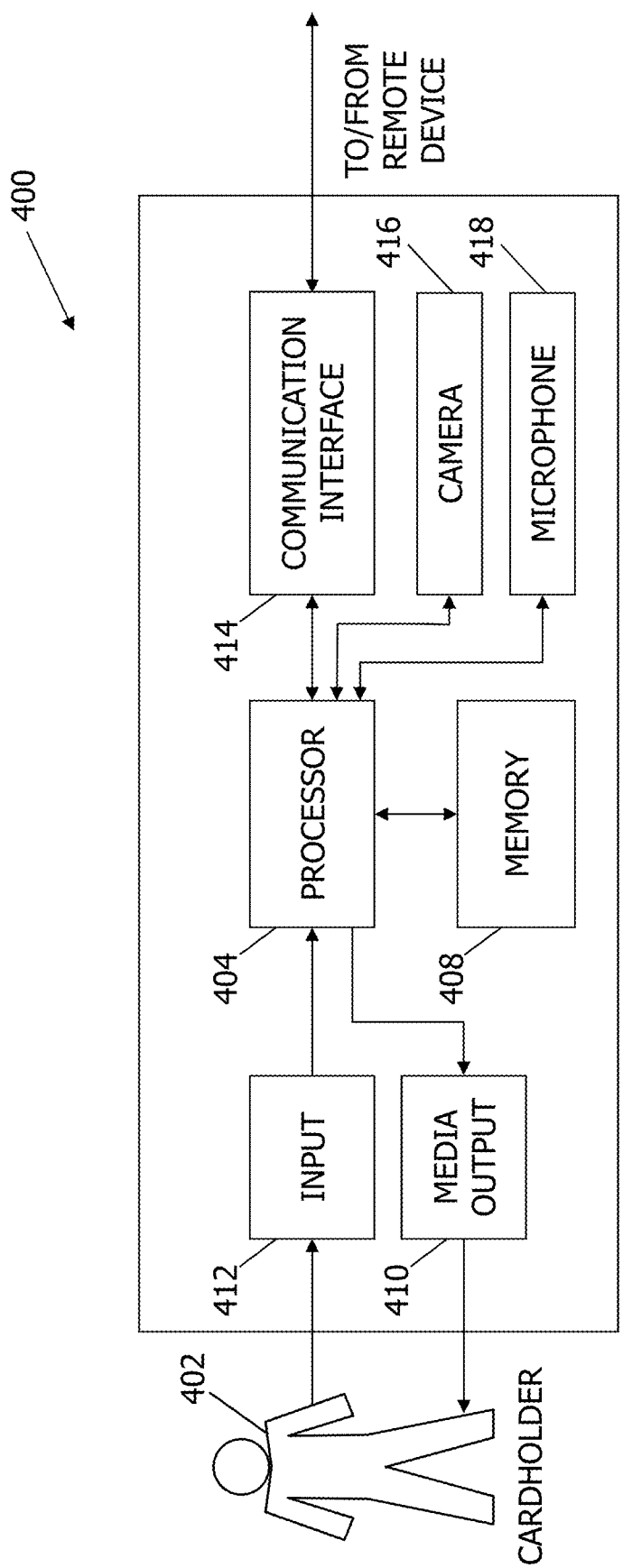
FIG. 4 illustrates an example configuration of a user device for the system shown in FIGS. 1 and 3.

FIG. 4 illustrates an example configuration of a device 400 operated by a user 402, such as any of the parties described above. User device 400 may include, but is not limited to, a smart phone, a tablet, a notebook or laptop computer, a desktop computer, and a website. In the example embodiment, device 400 includes a processor 404 for executing instructions. In some embodiments, executable instructions are stored in a memory area 408. Processor 404 may include one or more processing units, for example, a multi-core configuration. Memory area 408 is any device allowing information such as executable instructions and/or written works to be stored and retrieved. Memory area 408 may include one or more computer readable media.

The device 400 may also include at least one media output component 410 for presenting information to user 402. Media output component 410 is any component capable of conveying information to user 402. In some embodiments, media output component 410 includes an output adapter such as a video adapter and/or an audio adapter. An output adapter is operatively coupled to processor 404 and operatively couplable to an output device such as a display device, a liquid crystal display (LCD), organic light emitting diode (OLED) display, or "electronic ink" display, or an audio output device, a speaker or headphones.

In some embodiments, the device 400 includes an input device 412 for receiving input from user 402. Input device 412 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 410 and input device 412. The device 400 may also include a communication interface 414, which is communicatively couplable to a remote device in the card payment system network or with other remote devices via networks other than the payment system. Communication interface 414 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN). The device also includes a camera 416 as shown for providing images to the personal property inventory captivator computing device 302 and a microphone 418 for interacting with the personal property inventory captivator computing device 302, and specifically the augmented reality guide thereof, to create a personal property interface as described above.

Stored in memory area 408 are, for example, computer readable instructions for providing a user interface to user 402 via media output component 410 and, optionally, receiving and processing input from input device 412. A user interface may include, among other possibilities, a web browser and client application. Web browsers enable users, such as user 402, to display and interact with media and other information typically embedded on a web page or a website. An application allows user 402 to interact with a server application from a server system.

Multiple user devices 400 are contemplated and respectively provided for use by cardholders, representatives of the issuer, representatives of the payment processor, representatives of the merchant bank, representatives of merchants, and representatives of the personal property inventory captivator computing device 302 device to effect the system as shown in FIG. 3. Additional and/or alternative users and user devices may be provided, however, as desired for use with the system.

In a variety of contemplated examples, different combinations of user devices, being the same or different from one another, may be utilized in the system with otherwise similar effect. One or more of the user devices may be a mobile device, such as any mobile device capable of interconnecting to the Internet including a smart phone, personal digital assistant (PDA), a tablet, a smart camera or other web-based connectable equipment. Alternatively, one or more of the user devices may be a desktop computer or a laptop computer. Each of the user devices may be associated with a different user as described. Each user device may be interconnected to the Internet through a variety of interfaces including a network, such as a local area network (LAN) or a wide area network (WAN), dial-in connections, cable modems and special high-speed ISDN lines.

Figure 5:
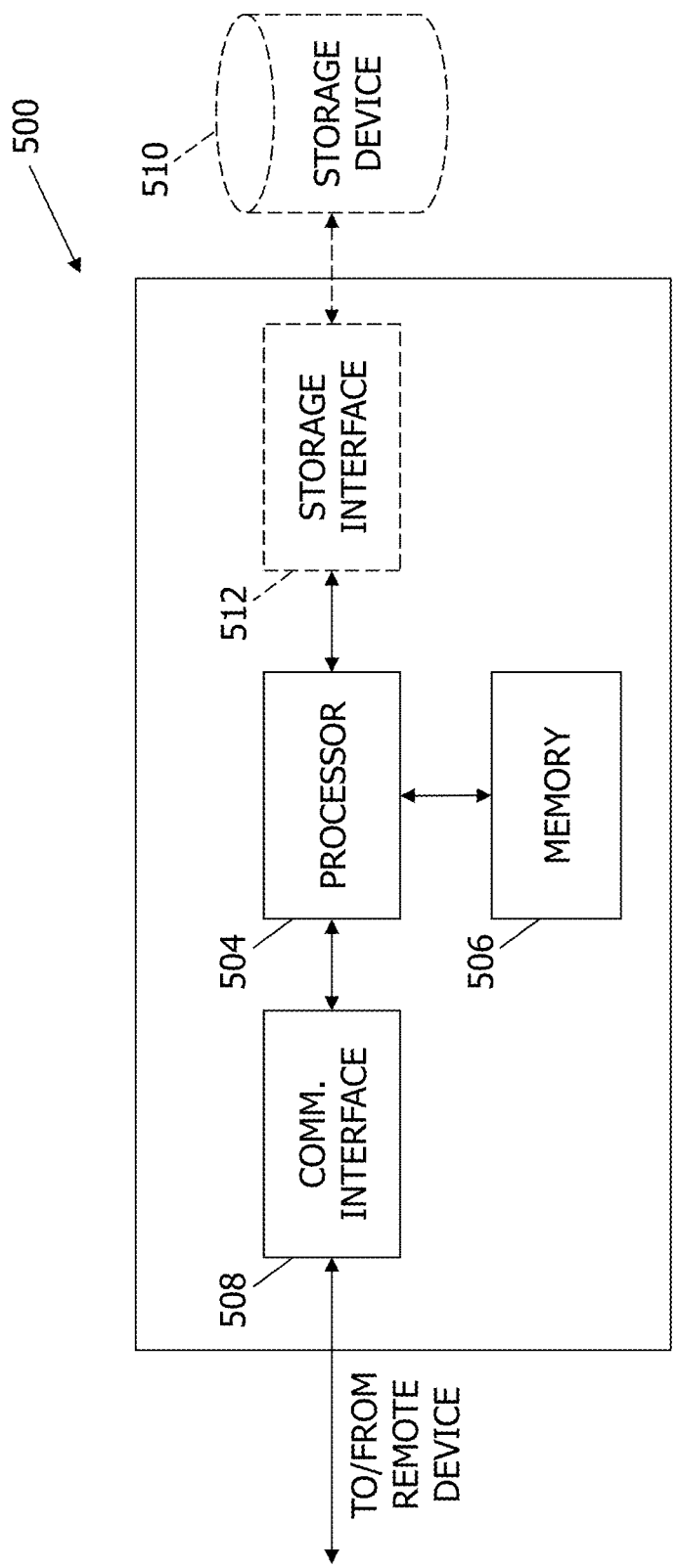
FIG. 5 is a schematic diagram of an example server computing device that may be used with the computer system shown in FIG. 3.

FIG. 5 illustrates an example configuration of a personal property inventory captivator computing device 500 that confers the personal property inventory services described above. The computing device 500 is sometimes referred to herein as a server-based network "host" device that coordinates and manages the computer vision, natural language processing, and augmented reality services described above, although it is not strictly necessary in all embodiments that the host computing device is a server system.

As shown in FIG. 5, the personal property inventory captivator computing device 500 includes a processor 504 for executing instructions. Instructions may be stored in a memory area 506, for example. Processor 504 may include one or more processing units (e.g., in a multi-core configuration).

Processor 504 is operatively coupled to a communication interface 508 such personal property inventory captivator computing device 500 is capable of communicating with a remote device such as a device of the payment network described above, the cardholder device 304, an insurance provider device 306, the computer vision device 308, the natural language processor 310, or the augmented reality device 326.

Processor 504 may also be operatively coupled to a storage device 510. Storage device 510 is any computer-operated hardware suitable for storing and/or retrieving data. In some embodiments, storage device 510 is integrated in personal property inventory captivator computing device 500. For example, personal property inventory captivator computing device 500 may include one or more hard disk drives as storage device 510. In other embodiments, storage device 510 is external to personal property inventory captivator computing device 500 and may be accessed by a plurality of server computer devices. For example, storage device 510 may include multiple storage units such as hard disks or solid state disks in a redundant array of inexpensive disks (RAID) configuration. Storage device 510 may include a storage area network (SAN) and/or a network attached storage (NAS) system.

The storage device 510 may include a database server and database which contains information and transaction data for enrolled cardholders, enrolled insurers, object recognition data, object value data, inventory baseline data, or other data needed by the system to operate as described. In one embodiment, the database is centralized and stored on the server system 500. In an alternative embodiment, the database is stored remotely from the server system 500 and may be non-centralized.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory area 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
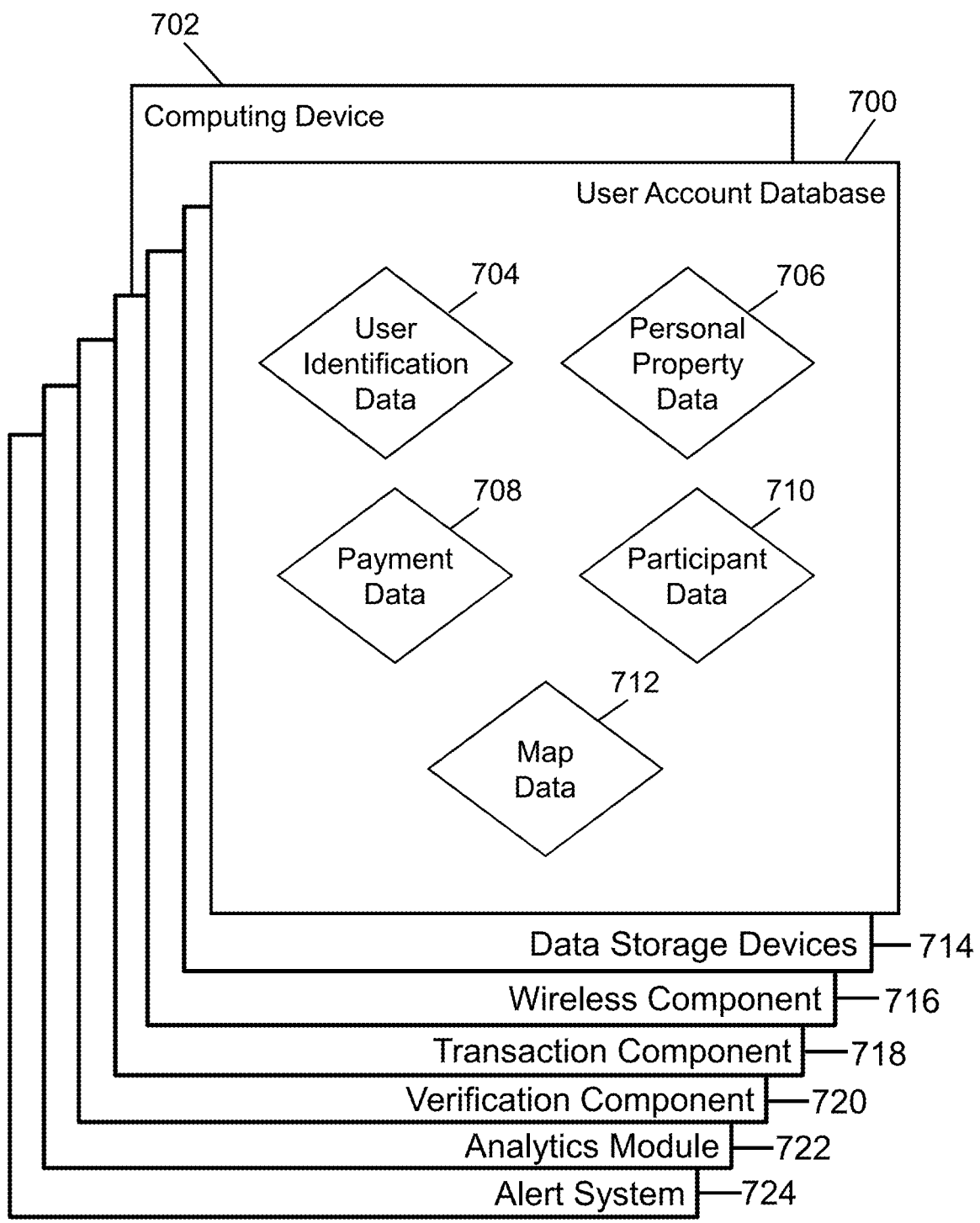
FIG. 6 shows an example configuration of a user account database within a computing device, along with other related computing components, that may be used to create, organize, and monitor a plurality of user data associated with a user.

FIG. 6 shows an example configuration of a user account database 700, within a computing device 702, along with other related computing components, that may be used to create, organize, and monitor a plurality of user data associated with a user account. In some embodiments, computing device 702 is the same or similar to server system 500. User account database 700 is coupled to several separate components within computing device 702, which perform specific tasks.

In the example embodiment, database 700 includes user identification data 704, personal property data 706, payment data 708, registration data 710, and participant data 712. In contemplated embodiments, user identification data 704 includes, but is not limited to, a user name, a user address, and a user phone number. Personal property data 706 includes cardholder enrollment data, insurance enrollment data, inventory data, value data and other data needed to provide the personal property inventory services provided. Payment data 708 includes, but is not limited to, card information, payment history, and a billing address. Participant data 710 includes information associated with participating insurance providers, including insurance provider identifiers, address information, contact information, etc. Participant data 712 also includes data associated with third party information (e.g., system administrators).

Computing device 702 includes the database 700, as well as data storage devices 714. Computing device 702 also includes a wireless component 716 and a transaction component 718 for correlating, for example, payment card transactions. An analytics module 722 is included for analyzing transactions, enrollment status, personal property inventory creation and analysis, and other items of interest. Further included is a verification module 720 that may communicate with a device in the payment network or another device, and an alert module 724 for transmitting an alert to a cardholder, insurance provider, or any other party.

Figure 7:
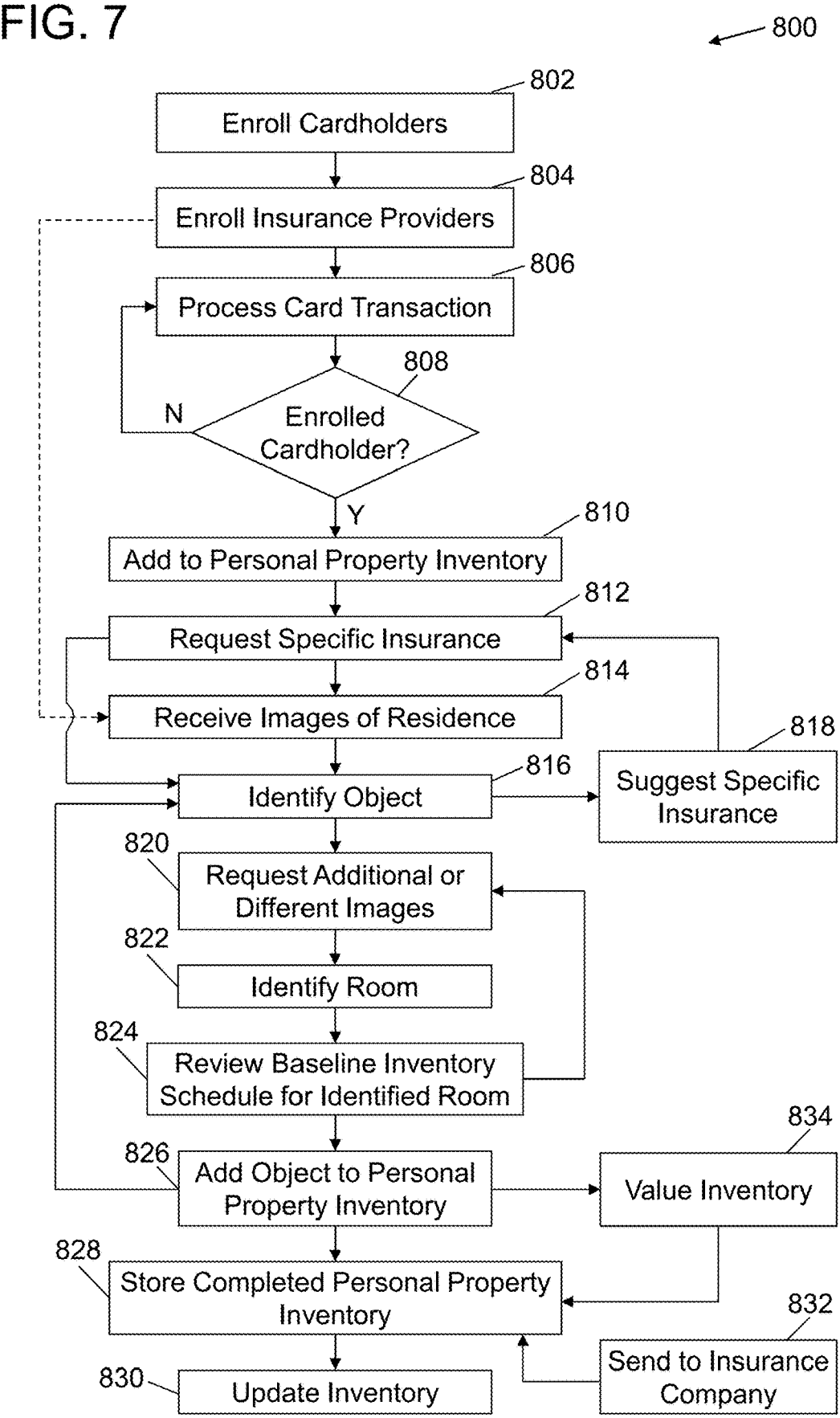
FIG. 7 shows an exemplary process of personal property compilation for the system shown in FIG. 3.

FIG. 7 shows an exemplary process 800 of personal property inventory compilation for the system 300 shown in FIG. 3.

At step 802, cardholders are enrolled. As contemplated, the enrollment includes opt-in informed consent consistent with application consumer protection and privacy laws and regulations. Cardholder profiles and preferences are accepted by the system as part of the enrollment. Also, as part of the enrollment step, cardholders may consent to use of location of services on a cardholder device in relation to the system 300. An app may be made available for cardholders to download on their cardholder devices (e.g., smartphones or tablet devices) for convenient entry, review, and updates to their personal profile and settings or preferences for the personal property inventory services provided. Otherwise, cardholders may access the system via a portal for initial enrollment, to check status, or change or update profiles, preferences or settings for the personal property inventory services.

At step 804, insurance providers are enrolled. Insurance provider enrollment may include acceptance of insurance provider profiles and preferences such as those described above. An app may be made available for merchants to download on their insurance provider devices (e.g., smartphones or tablet devices) for convenient entry, review, and updates to their insurance provider profile and settings or preferences for the personal property services provided. Otherwise, insurance providers may access the system via a portal for initial enrollment, to check status, or change or update their profiles, preferences or settings for the personal property services.

At step 806, payment card transactions are processed in a conventional manner. At step 808, the transaction data is accepted and analyzed by the system to determine if a processed transaction was made by an enrolled cardholder. For example, the system may compare a primary account number (PAN) of a processed transaction to see if matches a PAN of an enrolled cardholder. If the analyzed transaction does not involve an enrolled cardholder, the system reverts to step 806 and processes additional payment card transactions.

If the analyzed transaction does involve an enrolled cardholder, the system at step 810 automatically adds purchased items (or not) to the personal property inventory according to the cardholder preferences per the enrollment step. The personal property inventory may therefore be modified purchase-by-purchase and remain up to date as items are acquired. Considering that more than one cardholder may live in the same residence, step 810 is cumulative of the different enrolled cardholders living in the residence. Alternatively, the step 810 may be selectively performed for some enrolled cardholders but not others as desired per user enrollment and registration preferences.

At step 812, the system requests (or not) specific insurance for a purchased item identified by the transaction data according to the cardholder preferences per the enrollment step. The request may be a quote for insurance from the insurance provider, or may include an application for insurance from the insurance provider.

As mentioned above, the system does not necessarily depend on transaction data to operate and as such steps 806, 808, 810 and 812 need not be performed in all embodiments. The system could therefore proceed from step 804 to step 814.

At step 814, the cardholder provides images of the residence for analysis by the system using a cardholder device as described above. Based on the images provided by the cardholder device and received on the system, the system begins to create and populate a personal property inventory for personal property items in the residence in an automated and guided manner as described above.

At step 816 an object is identified in a received image. The object may be identified with the computer vision components, may be identified by the cardholder to the system as described above, or may be identified by scanning a local network in the residence to identify connected devices. An object may also be identified with respect to transaction data for at least one resident cardholder. Other identification techniques are, of course, possible in further and/or alternative embodiments.

At step 818, the system suggests specific insurance for the identified object. The suggestion may be made by the augmented reality guide or via a text box or bubble overlaid in the image, or in another manner as desired. If the cardholder desires to obtain specific insurance, the system reverts to step 812 and requests the same. The system then reverts to step 816 to identify another object.

At step 820, the system may request additional or different images to facilitate an identification of an object as described in the examples above. The request may be made by the augmented reality guide or via a text box or bubble overlaid in the image or another graphic overlaid on the image to be viewed by the cardholder.

At step 822, the system identifies the room based on identified objects in the images received. The identification may be made by the augmented reality guide or via a text box or bubble overlaid in the image. Alternatively, the system may ask the user to identify the room via the augmented reality guide or via a selection window or menu presented on the image seen by the cardholder.

At step 824, the system retrieves the baseline schedule of personal property for the identified room and compares it to objects identified in the room. The system may revert to step 820 and request additional or different images to locate objects on the schedule, but not yet identified in images received. The system may inquire regarding items on the baseline schedule that are not identified by the system in the images received. In some cases, the identification of the room may be made in reference to the baseline schedules provided once a sufficient number of matching items is made. The baseline schedule in some cases may be generated at least in part in view of the payment card transaction data for at least one resident. The baseline schedule may also be intelligently modified in view of data collected by the system across a number of users as payment card transaction data is received and personal property inventories of different residences are made.

At step 826, the system adds an identified object to the personal property inventory and reverts to step 826 to identify another object in the room. The identification of the object may include a descriptive name, a model number, dimensions, or notes as desired. For example, a refrigerator may be identified in the inventory by brand, storage capacity and style, and finish (e.g., Brand X, 25.0 cubic feet, French door refrigerator with thru-the-door ice and water dispenser, stainless steel). As another example, a television may be identified as Brand X, 55" Class (54.6" Diag.)—LED—1080p—Smart—HDTV. Objects may likewise be identified with SKU numbers and the like that can be used to retrieve further details and information about the item when desired or as needed.

The system continues to process additional objects in steps 814 through 826 until the inventory in the room is complete. The cardholder than can then provide images of another room for the process to repeat at steps 814 through 826 until all rooms in the residence are inventoried. The system can request clarification or confirmation if certain rooms are not identified.

At step 828, the personal property inventory is completed and stored on the system. The cardholder, or the respective insurance provider, may access the list online via the system at any time desired. The inventory is itemized and may be sorted by the cardholder or insurance provider for review purposes. A room-by-room itemized inventory may be provided in varying levels of detail as requested by the cardholder or an insurance provider. For example, model numbers, dimensions, or other descriptors and the like may or not be shown on an inventory report depending on the particular needs of the cardholder or the insurance company at the time that the inventory is being reviewed.

At step 830, the inventory is updated by repeating the process 800 described above. The update may be made in reference to the previously completed inventory to complete the update in a reduced amount of time, or may be entirely re-created as if no previous completed inventory existed. The update may be prompted by a reminder generated by the system in an active or passive manner. Real-time updates may also be automatically undertaken as purchases are made with a payment card as described above. If desired, the system may generate a notification that the personal property inventory has been updated.

At step 832, the personal property inventory is sent to the insurance company, either for insurance provider records or to make a personal property insurance claim. In a case where the personal property inventory is automatically updated as items are acquired, the system can send the personal property inventory report to the insurance company on a periodic basis. Reports can likewise be sent to the cardholders on a periodic basis, or the system can send a reminder or notification to the cardholder to review the personal property inventory report online to make sure that it is accurate.

At step 834, the inventory is valued for review by the cardholder or the insurance provider to assess insurance coverage in view of the total value of the items inventoried. Individual items in the inventory may be valued in any manner desired and not solely in relation to the valuing techniques described above. The value of items in the personal property inventory may be reported by room in an itemized manner or in another manner as desired, and the items valued may be sorted to meet the needs of a cardholder or an insurance provider at the time of review. For example, the items inventoried may be sorted from greatest value to least value. The cardholder may opt to receive and review the inventory for some rooms but not others as a matter of convenience. Separately insured items may also be reported by value so that the cardholder may evaluate general coverage and specific coverage to assess present insurance coverage. A list of items can be generated that includes items that are eligible for specific insurance, but are not specifically insured.

FIG. 8 illustrates an exemplary operation of the system 300 (FIG. 3) and process 800 (FIG. 7) in a first portion of personal property inventory creation. As shown in FIG. 8, the cardholder device 304 captures an image 900 of an entertainment center at some distance from the entertainment center in the room. The system generates the augmented reality guide 902 to say (either in text or audibly) "Is that a big screen TV? Zoom in on that!" The augmented reality guide 902 may be the aforementioned Flo of Progressive Insurance Company in one example, although any other augmented reality guide may likewise be generated by the system and overlaid on the image 900. The augmented reality guide 902 may request view of other objects or that images from different perspectives be obtained in each room to ensure that all personal property items to be inventoried can be identified.

FIG. 9 illustrates an exemplary operation of the system 300 (FIG. 3) and process 800 (FIG. 7) in a second portion of personal property inventory creation. As shown in FIG. 9, the cardholder has granted permission to allow the system to scan a network in the residence to identify connected devices. A list of devices 904 is generated for review by the cardholder via the device 304. The system generates the augmented reality guide 902 to say (either in text or audibly) "I scanned your network! Are there any other devices?" The augmented reality guide 902 may similarly request clarification or confirmation of rooms in the residence that have not been identified, expected objects that were not identified in certain rooms, or objects that the system is not able to identify.

As will be appreciated based on the foregoing specification, the above-described embodiments of the disclosure may be implemented using computer programming or engineering techniques including computer software, firmware, hardware or any combination or subset thereof, wherein the technical effects described above are achieved. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electronic personal property inventory creation system for insurance assessment of personal property items located in a residence, the system comprising:
   at least one host computing device comprising at least one processor in communication with a memory device,
   wherein the at least one host computing device is configured to:
      receive, from at least one user computing device associated with at least one resident of the residence, images of personal property items in a plurality of rooms of the residence;
      analyze, using an object recognition component, the images to determine a dimensional aspect for each of the personal property items in each of the plurality of rooms, wherein determining the dimensional aspect comprises determining a size and a shape of each of the personal property items, thereby identifying each of the personal property items;
      in response to identifying each of the personal property items, generate a personal property inventory for each of the plurality of rooms, the personal property inventory including each of the identified personal property items in each of the plurality of rooms;
      compare the personal property inventory for each of the plurality of rooms to a predetermined schedule of items stored in the memory device, the predetermined schedule of items generated at least in part by parsing received purchase transaction data from a multi-party payment processing network, the purchase transaction data associated with the at least one resident of the residence, the predetermined schedule of items including at least one item purchased using a payment account associated with the at least one resident and the purchase transaction data;
      in response to the comparison, if the at least one item on the predetermined schedule of items does not match one of the identified personal property items in each respective one of the personal property inventory for each of the plurality of rooms, generate an inquiry for the at least one resident of the residence to clarify whether or not the at least one item is in the respective room;
      cause the at least one user computing device to display a computer-generated (CG) element superimposed onto the viewer's physical environment to create an augmented reality, the CG element asking the inquiry to the at least one resident;
      receive an answer to the generated inquiry from the at least one user computing device; and
      based on the identified personal property items and the answer from the at least one user computing device, determine whether to update the personal property inventory for each of the plurality of rooms of the residence, thereby ensuring accuracy of the personal property inventory.

2. The system of claim 1, wherein the at least one host computing device is in communication with the multi-party payment processing network for processing payment card transactions, the at least one host computing device further configured to:
   receive the purchase transaction data from the multi-party payment processing network for the at least one resident; and
   generate the predetermined schedule of items based upon the received purchase transaction data.

3. The system of claim 1, wherein the at least one host computing device is further configured to:
   accept a user identification of at least one personal item in a received image.

4. The system of claim 1, wherein the at least one host computing device is in communication with the multi-party payment processing network for processing payment card transactions, and the at least one host computing device further configured to:
   receive the purchase transaction data from the multi-party payment processing network;
   identify the purchase transaction data as involving the at least one resident; and
   based on the identified purchase transaction data, automatically add to the predetermined schedule of items a purchased personal property item included in the identified purchase transaction data.

5. The system of claim 1, wherein the at least one host computing device is configured to:
   identify at least one personal property item from an analyzed image that is specifically insurable; and
   notify the at least one resident of the residence of the specifically insurable item.

6. The system of claim 5, wherein the at least one host computing device is configured to automatically apply for insurance coverage of the specifically insurable item.

7. The system of claim 5, wherein the at least one host computing device is configured to request a quote for insurance coverage of the specifically insurable item.

8. The system of claim 1, wherein the at least one host computing device is configured to request additional or different images of at least one object in a received image.

9. The system of claim 1, wherein the at least one host computing device is configured to scan a network associated with the residence to identify the personal property items connected to the network.

10. The system of claim 1, wherein the at least one host computing device is configured to generate the CG element, and wherein the CG element includes an augmented reality guide to assist in the creation of the personal property inventory.

11. The system of claim 10, wherein the augmented reality guide is one of an insurance company spokesperson or an insurance company mascot.

12. The system of claim 10, wherein the at least one host computing device is configured to conduct, via the augment reality guide, a natural language verbal exchange with the at least one resident of the residence.

13. The system of claim 1, wherein the at least one host computing device is configured to value items in the personal property inventory.

14. The system of claim 1, wherein the at least one host computing device is configured to store the personal property inventory in a customer database at a location remote from the residence.

15. A method for electronically generating a personal property inventory for insurance assessment of personal property items located in a residence, the method implemented by at least one host computing device including at least one processor in communication with a memory device, the method comprising:
receiving, from at least one user computing device associated with at least one resident of the residence, images of personal property items in a plurality of rooms of the residence;
analyzing, using an object recognition component, the images to determine a dimensional aspect for each of the personal property items in each of the plurality of rooms, wherein determining the dimensional aspect comprises determining a size and a shape of each of the personal property items, thereby identifying each of the personal property items;
in response to identifying each of the personal property items, generating a personal property inventory for each of the plurality of rooms, the personal property inventory including each of the identified personal property items in each of the plurality of rooms;
comparing the personal property inventory for each of the plurality of rooms to a predetermined schedule of items stored in the memory device, the predetermined schedule of items generated at least in part by parsing received purchase transaction data from a multi-party payment processing network, the purchase transaction data associated with the at least one resident of the residence, the predetermined schedule of items including at least one item purchased using a payment account associated with the at least one resident and the purchase transaction data;
in response to the comparison, if the at least one item on the predetermined schedule of items does not match one of the identified personal property items in each respective one of the personal property inventory for each of the plurality of rooms, generating an inquiry for the at least one resident of the residence to clarify whether or not the at least one item is in the respective room;
causing the at least one user computing device to display a computer-generated (CG) element superimposed onto the viewer's physical environment to create an augmented reality, the CG element asking the inquiry to the at least one resident;
receiving an answer to the generated inquiry from the at least one user computing device; and
based on the identified personal property items and the answer from the at least one user computing device, determine whether to update the personal property inventory for each of the plurality of rooms of the residence, thereby ensuring accuracy of the personal property inventory.

16. The method of claim 15, wherein the at least one host computing device is in communication with the multi-party payment processing network for processing payment card transactions, the method further comprising:
receiving the purchase transaction data from the multi-party payment processing network for the at least one resident; and
generating the predetermined schedule of items based upon the received purchase transaction data.

17. The method of claim 15, further comprising:
accepting a user identification of at least one personal item in a received image.

18. The method of claim 15, wherein the at least one host computing device is in communication with the multi-party payment processing network for processing payment card transactions, and the method further comprising:
receiving the purchase transaction data from the multi-party payment processing network;
identifying the purchase transaction data as involving at least one resident; and
based on the identified purchase transaction data, automatically adding to the predetermined schedule of items a purchased personal property item included in the identified purchase transaction data.

19. The method of claim 15, further comprising:
identifying at least one personal property item from an analyzed image that is specifically insurable; and
notifying the at least one resident of the residence of the specifically insurable item.

20. The method of claim 19, further comprising automatically applying for insurance coverage of the specifically insurable item.

21. The method of claim 19, further comprising requesting a quote for insurance coverage of the specifically insurable item.

22. The method of claim 15, further comprising requesting additional or different images of at least one object in a received image.

23. The method of claim 15, further comprising scanning a network associated with the residence to identify the personal property items connected to the network.

24. The method of claim 15, further comprising generating the CG element, wherein the CG element includes an augmented reality guide to assist in the creation of the personal property inventory in the residence.

25. The method of claim 24, wherein the augmented reality guide is one of an insurance company spokesperson or an insurance company mascot.

26. The method of claim 24, further comprising conducting, via the augment reality guide, a natural language verbal exchange with the at least one resident of the residence.

27. The method of claim 15, further comprising valuing items in the personal property inventory.

28. The method of claim 15, further comprising storing the personal property inventory in a customer database at a location remote from the residence.

29. A non-transitory computer readable medium that includes computer executable instructions for electronically generating a personal property inventory for insurance assessment of personal property items located in a residence, wherein when executed by at least one host computing device having at least one processor in communication with a memory device, the computer executable instructions cause the at least one host computing device to:
 receive, from at least one user computing device associated with at least one resident of the residence, images of personal property items in a plurality of rooms of the residence;
 analyze, using an object recognition component, the images to determine a dimensional aspect for each of the personal property items in each of the plurality of rooms, wherein determining the dimensional aspect comprises determining a size and a shape of each of the personal property items, thereby identifying each of the personal property items;
 in response to identifying each of the personal property items, generate a personal property inventory for each of the plurality of rooms, the personal property inventory including each of the identified personal property items in each of the plurality of rooms;
 compare the personal property inventory for each of the plurality of rooms to a predetermined schedule of items stored in the memory device, the predetermined schedule of items generated at least in part by parsing received purchase of transaction data from a multi-party payment processing network, the purchase transaction data associated with the at least one resident of the residence, the predetermined schedule of items including at least one item purchased using a payment account associated with the at least one resident and the purchase transaction data;
 in response to the comparison, if the at least one item on the predetermined schedule of items does not match one of the identified personal property items in each respective one of the personal property inventory for each of the plurality of rooms, generate an inquiry for the at least one resident of the residence to clarify whether or not the at least one item is in the respective room;
 cause the at least one user computing device to display a computer-generated (CG) element superimposed onto the viewer's physical environment to create an augmented reality, the CG element asking the inquiry to the at least one resident;
 receive an answer to the generated inquiry from the at least one user computing device; and
 based on the identified personal property items and the answer from the at least one user computing device, determine whether to update the personal property inventory for each of the plurality of rooms of the residence, thereby ensuring accuracy of the personal property inventory.

30. The non-transitory computer readable medium of claim 29, the computer executable instructions further causing the at least one host computing device to value items in the personal property inventory.

31. The non-transitory computer readable medium of claim 29, the computer executable instructions further causing the at least one host computing device to:
 identify at least one personal property item from an analyzed image that is specifically insurable; and
 notify the at least one resident of the residence of the specifically insurable item.

32. An electronic personal property inventory creation system for insurance assessment of personal property items located in a residence, the system comprising:
 at least one host computing device comprising at least one processor in communication with a memory device,
 wherein the at least one host computing device is configured to:
  receive, from at least one user computing device associated with at least one resident of the residence, images of personal property items in a plurality of rooms of the residence;
  analyze, using an object recognition component, the images to determine a dimensional aspect for each of the personal property items in each of the plurality of rooms, wherein determining the dimensional aspect comprises determining a size and a shape of each of the personal property items, thereby identifying the personal property items;
  in response to not identifying one or more of the personal property items, request, to the at least one resident, one of an additional image and a clarifying detail to identify the one or more of the personal property items based on one of the additional image and the clarifying detail;
  in response to identifying each of the personal property items, generate a personal property inventory for each of the plurality of rooms, the personal property inventory including each of the identified personal property items in each of the plurality of rooms;
  compare the personal property inventory for each of the plurality of rooms to a predetermined schedule of items stored in the memory device, the predetermined schedule of items generated at least in part by parsing received purchased transaction data from a multi-party payment processing network, the purchase transaction data associated with the at least one resident of the residence, the predetermined schedule of items including at least one item purchased using a payment account associated with the at least one resident and the purchase transaction data;
  in response to the comparison, if the at least one item on the predetermined schedule of items does not match one of the identified personal property items in each respective one of the personal property inventory for each of the plurality of rooms, generate an inquiry for the at least one resident of the residence to clarify whether or not the at least one item is in the respective room;
  cause the at least one user computing device to display a computer-generated (CG) element superimposed onto the viewer's physical environment to create an augmented reality, the CG element asking the inquiry to the at least one resident;
  receive an answer to the generated inquiry from the at least one user computing device; and
  based on the identified personal property items and the answer from the at least one user computing device, determine whether to update the personal property inventory for each of the plurality of rooms of the residence, thereby ensuring accuracy of the personal property inventory.

* * * * *